(12) United States Patent
Shibuya et al.

(10) Patent No.: US 10,265,654 B2
(45) Date of Patent: Apr. 23, 2019

(54) FILTERING MEDIUM FOR AIR FILTER, FILTER PACK, AIR FILTER UNIT, AND METHOD FOR PRODUCING FILTERING MEDIUM FOR AIR FILTER

(71) Applicant: DAIKIN INDUSTRIES, LTD., Osaka-shi, Osaka (JP)

(72) Inventors: Yoshiyuki Shibuya, Yuki (JP); Hideyuki Kiyotani, Settsu (JP); Kunihiko Inui, Settsu (JP); Li Bao, Yuki (JP); Shinichi Chaen, Settsu (JP); Seigo Yamamoto, Settsu (JP); Makoto Kobayashi, Yuki (JP); Hitoshi Niinuma, Yuki (JP)

(73) Assignee: Daikin Industries, Ltd., Osaka (JP)

( * ) Notice: Subject to any disclaimer, the term of this patent is extended or adjusted under 35 U.S.C. 154(b) by 422 days.

(21) Appl. No.: 15/127,367

(22) PCT Filed: Mar. 20, 2015

(86) PCT No.: PCT/JP2015/058534
§ 371 (c)(1),
(2) Date: Sep. 19, 2016

(87) PCT Pub. No.: WO2015/146847
PCT Pub. Date: Oct. 1, 2015

(65) Prior Publication Data
US 2017/0128876 A1   May 11, 2017

(30) Foreign Application Priority Data

Mar. 26, 2014 (JP) .............................. 2014-064337

(51) Int. Cl.
*B01D 53/22* (2006.01)
*B01D 46/54* (2006.01)
(Continued)

(52) U.S. Cl.
CPC ....... *B01D 46/543* (2013.01); *B01D 39/1623* (2013.01); *B01D 39/1692* (2013.01);
(Continued)

(58) Field of Classification Search
CPC combination set(s) only.
See application file for complete search history.

(56) References Cited

U.S. PATENT DOCUMENTS

2004/0168417 A1   9/2004   Tanaka et al.

FOREIGN PATENT DOCUMENTS

| CN | 1499995 A | 5/2004 |
|---|---|---|
| EP | 0 970 739 A1 | 1/2000 |

(Continued)

OTHER PUBLICATIONS

European Search Report of corresponding EP Application No. 15 76 7950.7 dated Oct. 12, 2017.
(Continued)

*Primary Examiner* — Anthony R Shumate
(74) *Attorney, Agent, or Firm* — Global IP Counselors, LLP

(57) ABSTRACT

A filtering medium includes first and second porous membranes mainly composed of fluororesin, and a plurality of air permeable supports to support the first and second membranes. The second membrane is disposed downstream of the first membrane. When air containing polyalphaolefin particles with a count median diameter of 0.25 μm is continuously passed through at a flow rate of 5.3 cm/sec and pressure loss is increased by 250 Pa, the first membrane has a dust retention amount larger than the second membrane. The filtering medium has a pressure loss of less than 200 Pa when air is passed through at a flow rate of 5.3 cm/sec. A collecting efficiency of NaCl particles with a particle diameter of 0.3 μm is 99.97% or more when air containing the (Continued)

NaCl particles is passed through at a flow rate of 5.3 cm/sec. The dust retention amount is 25 g/m² or more.

20 Claims, 4 Drawing Sheets

(51) Int. Cl.
*B01D 69/10* (2006.01)
*B01D 39/16* (2006.01)
*B01D 46/52* (2006.01)
*B01D 71/36* (2006.01)

(52) U.S. Cl.
CPC .......... *B01D 46/521* (2013.01); *B01D 69/10* (2013.01); *B01D 71/36* (2013.01); *B01D 2239/065* (2013.01); *B01D 2239/0654* (2013.01); *B01D 2239/10* (2013.01); *B01D 2239/1216* (2013.01); *B01D 2275/10* (2013.01); *B01D 2275/305* (2013.01)

(56) References Cited

FOREIGN PATENT DOCUMENTS

| | | |
|---|---|---|
| JP | 2814574 B2 | 8/1998 |
| JP | 11-9977 A | 1/1999 |
| JP | 2001-340732 A | 12/2001 |
| JP | 2013-52320 A | 3/2013 |
| TW | 201347839 A | 12/2013 |
| WO | 2013/157647 A1 | 10/2013 |

OTHER PUBLICATIONS

International Search Report of corresponding PCT Application No. PCT/JP2015/058534 dated Jun. 2, 2015.

FILTERING MEDIUM FOR AIR FILTER, FILTER PACK, AIR FILTER UNIT, AND METHOD FOR PRODUCING FILTERING MEDIUM FOR AIR FILTER

CROSS-REFERENCE TO RELATED APPLICATIONS

This U.S. National stage application claims priority under 35 U.S.C. § 119(a) to Japanese Patent Application No. 2014-064337, filed in Japan on Mar. 26, 2014, the entire contents of which are hereby incorporated by reference.

TECHNICAL FIELD

The present invention relates to a filtering medium for an air filter, a filter pack, an air filter unit, and a filtering medium for an air filter.

BACKGROUND ART

As a filtering medium for an air filter satisfying the requirement of a HEPA filter (High Efficiency Particulate Air Filter), a so-called glass filtering medium, which is a filtering medium prepared by using glass fiber, is known. The glass filtering medium of HEPA grade has high collecting efficiency of 99.97% for particles with a particle diameter of 0.3 μm, but has a high pressure loss. As a HEPA filter with low pressure loss which can be replaced with such a glass filtering medium, a filtering medium using polytetrafluoroethylene (PTFE) porous membrane, which is formed by drawing PTFE, is known. Compared to the glass filtering medium, the PTFE porous membrane has a high collecting efficiency and a low pressure loss so that the PTFE porous membrane has an excellent balance between the collecting efficiency and pressure loss.

Meanwhile, in order to have a filtering medium with long service life, it is recently required to increase a dust retention amount of a filtering medium. However, due to the thinness of a membrane, the dust retention amount of the above PTFE porous membrane is extremely small, and the PTFE porous membrane has a far less dust retention amount than that of a glass filtering medium. Accordingly, it may be considered to produce a filtering medium by attaching a melt-blown nonwoven fabric as a prefilter to a PTFE porous membrane, for example. However, in that case, because the total thickness of a filtering medium is increased due to the thickness of the nonwoven fabric, enough number of a folded filtering medium for insertion (number of pleats) cannot be ensured when the filtering medium is used for an air filter unit, and thus an increase in pressure loss, a decrease in collecting efficiency, and a decrease in dust retention amount are caused on the contrary.

Meanwhile, as a filtering medium having improved dust retention amount while maintaining the HEPA grade, there is a filtering medium for an air filter described in WO 2013/157647 A, which is suggested by the applicant of the present invention. According to the filtering medium of Patent Literature 1, it is described that, although the collecting efficiency is slightly lower than the PTFE porous membrane, since the pressure loss is greatly improved compared to the PTFE porous membrane while maintaining the HEPA grade and also the membrane thickness is high. The dust retention amount close to that of a class filtering medium can be obtained.

SUMMARY

Technical Problem

However, as there is a strong demand for having a filtering medium with long service life, it is required to have a further improvement of dust retention amount.

An object of the present invention is to provide a filtering medium for an air filter which has a greatly increased dust retention amount while maintaining high collecting efficiency, a filter pack, an air filter unit, and a method for producing the filtering medium for an air filter.

Solution to Problem

One embodiment of the present invention is a filtering medium for an air filter for collecting fine particles in air which is provided with a first porous membrane mainly composed of a fluororesin, a second porous membrane mainly composed of a fluororesin that is disposed on the downstream side of airflow compared to the first porous membrane, and a plurality of air permeable supports disposed to form at least the outermost layer of the filtering medium for an air filter to support the first porous membrane and the second membrane, wherein when the air containing polyalphaolefin particles with a count median diameter of 0.25 μm is continuously passed through at a flow rate of 5.3 cm/sec and the pressure loss is increased by 250 Pa, the first porous membrane has a dust retention amount of the polyalphaolefin particles which is larger than that of the second porous membrane, the filtering medium for an air filter has a pressure loss of less than 200 Pa when the air is passed through at a flow rate of 5.3 cm/sec, a collecting efficiency for NaCl particles with a particle diameter of 0.3 μm is 99.97% or more when the air containing the NaCl particles is passed through at a flow rate of 5.3 cm/sec, and when the air containing polyalphaolefin particles with a count median diameter of 0.25 μm is continuously passed through at a flow rate of 5.3 cm/sec and the pressure loss is increased by 250 Pa, the dust retention amount is 25 g/m$^2$ or more.

Another embodiment of the present invention is provided with the filtering medium for an air filter, wherein the filtering medium for an air filter is processed to have a zigzag shape according to alternatively repeated outside folding and inside folding.

Another embodiment of the present invention is an air filter unit provided with the filtering medium for an air filter and a frame body for supporting the filtering medium for an air filter or the filter pack.

Another embodiment of the present invention is an air filter unit provided with the A method for producing a filtering medium for an air filter for collecting fine particles in air, the method comprising the following steps:

(a) a step for preparing a first porous membrane by using a fluororesin and a liquid lubricant;

(b) a step for preparing a second porous membrane to have a smaller average pore diameter than the first porous membrane by using a fluororesin and a liquid lubricant; and (c) a step for producing the filtering medium for an air filter by laminating the first porous membrane, the second porous membrane, and a plurality of air permeable supports which support the first porous membrane and the second porous membrane, wherein, in the step (c), the plurality of air permeable supports are disposed to form at least the outermost layer of the filtering medium for an air filter, the filtering medium for an air filter has the pressure loss of less than 200 Pa, a collecting efficiency for NaCl particles with a particle diameter of 0.3 μm is 99.97% or more when the air containing the NaCl particles is passed through at a flow rate of 5.3 cm/sec, and the dust retention amount of polyalphaolefin is 25 g/m$^2$ or more when the air containing the polyalphaolefin particles with a count median diameter of 0.25 μm is continuously passed through at a flow rate of 5.3 cm/sec and the pressure loss is increased by 250 Pa.

Advantageous Effects of Invention

According to the present invention, a filtering medium for an air filter which has a greatly increased dust retention amount while maintaining high collecting efficiency, a filter pack, and an air filter unit are obtained. Furthermore, according to the method for producing the filtering medium for an air filter of the present invention, a filtering medium for an air filter which has an increased dust retention amount while maintaining high collecting efficiency is obtained.

DESCRIPTION OF EMBODIMENTS

Hereinbelow, the filtering medium for an air filter, filter pack, air filter unit, and method for producing the filtering medium for an air filter according to the embodiment of the present invention are described.
(Filtering Medium for Air Filter)

Figure 1A:
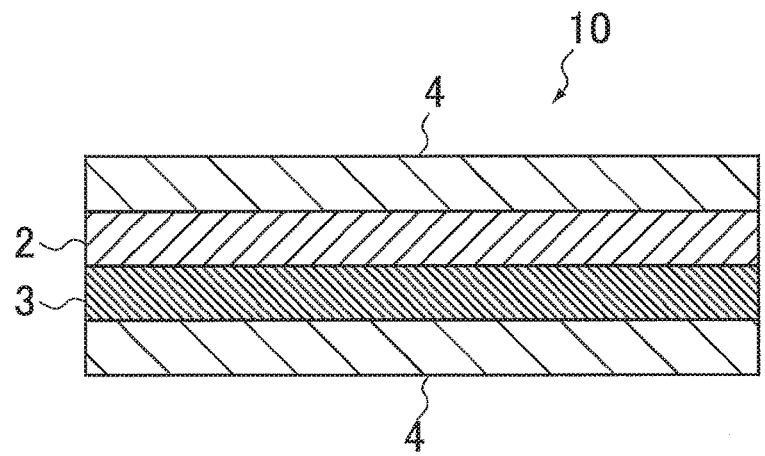
FIG. 1A is a cross-sectional view illustrating the layer configuration of a filtering medium with four layer structure according to the embodiment of the present invention.
Figure 1B:
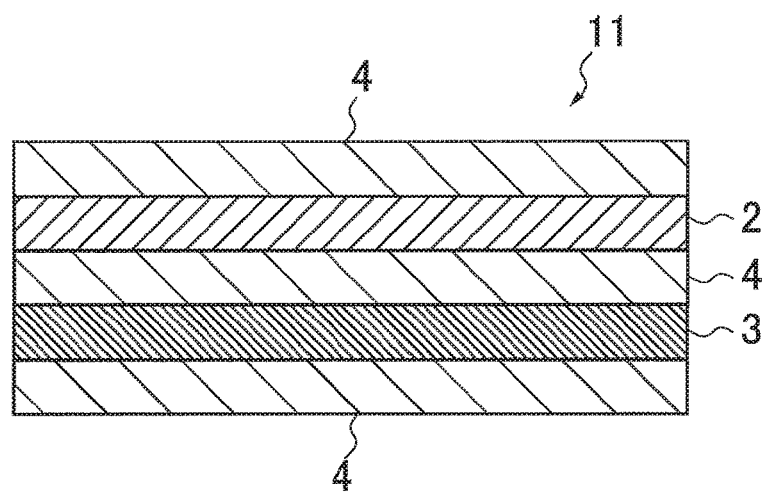
FIG. 1B is a cross-sectional view illustrating the layer configuration of a filtering medium with five layer structure according to the embodiment of the present invention.

In FIGS. 1A and 1B, the filtering medium for an air filter (hereinbelow, also simply referred to as a filtering medium) of the embodiment of the present invention is illustrated. FIG. 1A is a cross-sectional view illustrating the layer configuration of a filtering medium 10 with four layer structure according to the embodiment of the present invention. FIG. 1B is a cross-sectional view illustrating the layer configuration of a filtering medium 11 with five layer structure according to the embodiment of the present invention. Explanations of the filtering medium 11 of FIG. 1B will be given later.

The filtering medium 10 of the embodiment of the present invention is a filtering medium for an air filter to capture fine particles in the air. It is provided with a first porous membrane 2 and a second porous membrane 3 which have a difference in the dust retention amount, and plural air permeable support 4, and it is characterized in that the filtering medium 10 as a whole has a pressure loss of less than 200 Pa, collecting efficiency of 99.97% or more, and dust retention amount of 25 g/m$^2$ or more. Specifics regarding the dust retention amount, pressure loss, and collecting efficiency will be described later.

The filtering medium 10 has a four layer structure which consists of the first porous membrane 2, the second porous membrane 3, and two pieces of the air permeable support 4.
(1. Porous Membrane)

Both the first porous membrane 2 and the second porous membrane 3 are mainly composed of a fluororesin, and it has a porous membrane structure having fibrils (fiber) and nodes (knotted portions) that are connected to fibrils. As described herein, the "mainly" means that the fluororesin is contained in an amount of more than 50% by weight of the entire constitutional components of the first porous membrane 2 or the second porous membrane 3. In other words, the first porous membrane 2 or the second porous membrane 3 may contain a component which is different from the fluororesin in an amount of less than 50% by weight. Examples of the component different from the fluororesin include, for example, an inorganic filler which is a non-melt processable component which cannot be fibrillated (component B) as described below. The first porous membrane 2 is disposed on the upstream side of airflow (top side in FIGS. 1A and 1B), and the second porous membrane 3 is disposed on the downstream side of airflow (bottom side in FIGS. 1A and 1B) compared to the first porous membrane 1.

The fluororesin used for the first porous membrane 2 and the second porous membrane 3 may be composed of one type of component or two or more types of component. For example, as a fluororesin composed of one type of component, there can be PTFE which is used for the second porous membrane 5. Meanwhile, as described herein, when it is simply described as PTFE, it means the below-mentioned PTFE (PTFE with high molecular weight) which can be fibrillated, unless specifically described otherwise. Furthermore, as a fluororesin composed of two or more types of component, a mixture having three components, that is, PTFE which can be fibrillated (hereinbelow, also referred to as component A), a non hot-melt processable component which cannot be fibrillated (hereinbelow, also referred to as component B), and a hot-melt processable component having a melting point of lower than 320° C. which cannot be fibrillated (hereinbelow, also referred to as component C) can be mentioned, for example. The first porous membrane 2 is preferably composed of a combination of those three components. The first porous membrane composed of those three components has, compared to a PTFE porous membrane, a membrane structure having many pores and high membrane thickness. Accordingly, fine particles in the air may be captured in a broad range in thickness direction of a filtering medium, and thus the dust retention amount is enhanced. From this point of view, it is more preferable that both the first porous membrane 2 and the second porous membrane 3 are composed of those three components. Accordingly, the thickness of a whole filtering medium can be obtained at sufficient level so that the dust retention amount is further enhanced.

Hereinbelow, above described three kinds of the component are described in detail. With respect to content that fits into both the first porous membrane 2 and the second porous membrane 3, it is described simply using an expression "porous membrane" without distinction of them.

(a) PTFE that can be Fibrillated

The polytetrafluoroethylene that can be fibrillated is high molecular weight PTFE which is obtained by emulsion polymerization or suspension polymerization of tetrafluoroethylene (TFE), for example. As described herein, the high molecular weight means a molecular weight having a magnitude that fibrillation can be easily achieved during manufacture of a porous membrane so that a fibril with long fiber length is obtained and, as having standard specific gravity (SSG) of 2.130 to 2.230 and high melt viscosity, substantially no melt fluidization is exhibited. From the viewpoint of obtaining a fibril with long fiber length due to easy fibrillation, SSG of PTFE that can be fibrillated is preferably 2.130 to 2.190, and more preferably 2.140 to 2.170. When the SSG is excessively high, the drawing property of the mixture of each component of A to C may be deteriorated. When the SSG is excessively low, the rolling property is deteriorated so that the homogeneity of the porous membrane may be deteriorated and the pressure loss of the porous membrane may increase. Further, from the viewpoint of obtaining a fibril with long fiber length due to easy fibrillation, PTFE obtained by emulsion polymerization is preferable. The standard specific gravity (SSG) is measured on the basis of ASTM D 4895.

The presence or absence of fibrillating property, that is, the possibility of having fibrillation, can be determined based on the possibility of having paste extrusion, which is the representative method for molding high molecular weight PTFE powder made of TFE polymer, since high molecular weight PTFE generally has a fibrillating property when paste extrusion is possible. When an unsintered molded article obtained by paste extrusion substantially has no strength or elongation, that is, when it breaks by pulling as having elongation of 0%, it can be recognized to have no fibrillating property.

The above described high molecular weight PTFE can be modified polytetrafluoroethylene (hereinbelow, referred to as the modified PTFE), homo polytetrafluoroethylene (hereinbelow, referred to as the homo PTFE), or a mixture of the modified PTFE and the homo PTFE. The homo PTFE is not particularly limited, and any homo PTFE can be preferably used if it is described in JP 53-60979 A, JP 57-135 A, JP 61-16907 A, JP 62-104816 A, JP 62-190206 A, JP 63-137906 A, JP 2000-143727 A, JP 2002-201217 A, WO 2007/046345 A, WO 2007/119829 A, WO 2009/001894 A, WO 2010/113950 A, or WO 2013/027850 A. Among them, the homo PTFE having high drawing characteristics disclosed in JP 57-135 A, JP 63-137906 A, JP 2000-143727 A, JP 2002-201217 A, WO 2007/046345 A, WO 2007/119829 A, or WO 2010/113950 A is preferable.

The modified PTFE includes TFE and a monomer other than TFE (hereinbelow, referred to as a modified monomer). Examples of the modified monomer include modified monomers those modified homogeneously with a modified monomer, those modified at early stage of a polymerization reaction, or those modified at final stage of a polymerization reaction, but it is not particularly limited. As for the modified PTFE, any modified PTFE those described in JP 60-42446 A, JP 61-16907 A, JP 62-104816 A, JP 62-190206 A, JP 64-1711 A, JP 2-261810 A, JP 11-240917 A, JP 11-240918 A, WO 2003/033555 A, WO 2005/061567 A, WO 2007/005361 A, WO 2011/055824 A, or WO 2013/027850 A can be preferably used. Among them, the modified PTFE having high drawing characteristics disclosed in JP 61-16907 A, JP 62-104816 A, JP 64-1711 A, JP 11-240917 A, WO 2003/033555 A, WO 2005/061567 A, WO 2007/005361 A, or WO 2011/055824 A is preferable.

The modified PTFE contains a TFE unit based on TFE and a modified monomer unit based on the modified monomer. The modified monomer unit is a part of the molecular structure of the modified PTFE and it is a part derived from the modified monomer. The modified PTFE is preferably contained at 0.001 to 0.500% by weight, and more preferably at 0.01 to 0.30% by weight of the entire monomer units. The entire monomer units are a part derived from every monomer in the molecular structure of the modified PTFE.

The modified monomer is not particularly limited, if it is copolymerizable with TFE. Examples thereof include perfluoro-olefin such as hexafluoropropylene (HFP); chlorofluoro-olefin such as chlorotrifluoroethylene (CTFE); hydrogen-containing fluoro-olefin such as trifluoroethylene or vinylidene fluoride (VDF); perfluorovinyl ether; perfluoroalkyl ethylene (PFAE) and ethylene. The modified monomer which is used may be either one type or plural types.

Perfluorovinyl ether is not particularly limited, and examples thereof include a nonsaturated perfluoro compound represented by the following general formula (1)

$$CF_2=CF-ORf \qquad (1)$$

In the formula, Rf represents a perfluoro organic group.

As described herein, the perfluoro organic group is an organic group in which every hydrogen atom bound to the carbon atom is substituted with a fluorine atom. The perfluoro organic group may have ether oxygen.

Examples of perfluorovinyl ether include perfluoro(alkyl vinyl ether) (PAVE) of the general formula (1) in which Rf is a perfluoroalkyl group having 1 to 10 carbon atoms. Carbon atom number of the perfluoroalkyl group is preferably 1 to 5. Examples of the perfluoroalkyl group in PAVE include a perfluoromethyl group, a perfluoroethyl group, a perfluoropropyl group, a perfluorobutyl group, a perfluoropenty group, and a perfluorohexyl group. Preferred examples of PAVE include perfluoropropyl vinyl ether (PPVE) and perfluoromethyl vinyl ether (PMVE).

Above described perfluoroalkyl ethylene (PFAE) is not particularly limited, and examples thereof include perfluorobutyl ethylene (PFBE) and perfluorohexyl ethylene (PFHE) or the like.

As for the modified monomer of the modified PTFE, at least one selected from a group consisting HFP, CTFE, VDF, PAVE, PFAE, and ethylene is preferable.

In particular, from the viewpoint of obtaining a fibril with long fiber length due to easy fibrillation, it is preferable that the homo PTFE is contained in an amount of more than 50% by weight of the homo PTFE that can be fibrillated.

The PTFE that can be fibrillated can be a component that is composed of a plurality of components in the above described components.

The PTFE that can be fibrillated is, from the viewpoint of maintaining the fiber structure of the porous membrane 1, preferably contained in an amount of more than 50% by weight of the porous membrane.

(b) Non-Hot Melt Processable Component that is not Fibrillated

The non-hot melt processable component that is not fibrillated is mainly localized in the knotted portion as non-fibrous particles and it functions to suppress the fibrillation of PTFE that can be fibrillated. Examples of the non-hot melt processable component that is not fibrillated include a component having a thermoplastic property such as low molecular weight PTFE, a thermosetting resin, and an inorganic filler. When the component having a thermoplastic property, it is preferable to have melting temperature of 320° C. or higher and high melt viscosity. For example, because the low molecular weight PTFE has high melt viscosity, it can stay in the knotted portions even when it is processed at a temperature which is higher than the melting point. As described herein, the low molecular weight PTFE means PTFE with number average molecular weight of 600,000 or less, melting point of between 320 to 335° C., and melt viscosity at 380° C. of 100 to $7.0 \times 10^5$ Pa·s (see, JP 10-147617 A). The examples of the method for producing low molecular weight PTFE include a thermal decomposition method in which high molecular weight PTFE powder (molding powder) obtained from suspension polymerization of TFE or high molecular weight PTFE powder (fine powder) obtained from emulsion polymerization of TFE and a specific fluorinated compound are reacted according to contact at high temperature (see, JP 61-162503 A), a method of illuminating ionizing radiation to high molecular weight PTFE powder or a molded article (see, JP 48-78252 A), and a method of polymerizing directly TFE with a chain transfer agent (see, WO 2004/050727 A, WO 2009/020187 A, and WO 2010/114033 A) or the like. Like the PTFE that can be fibrillated, the low molecular weight PTFE can be also the homo PTFE or the modified PTFE including a modified monomer described above.

The low molecular weight PTFE has no fibrillating property. The presence or absence of the fibrillating property can be determined by the aforementioned method. With regard to the low molecular weight PTFE, the unsintered molded article obtained by paste extrusion has substantially no strength or elongation, for example, elongation of 0% and it breaks when pulled.

The low molecular weight PTFE used in the present invention is not particularly limited. However, those having melt viscosity at 380° C. of 1000 Pa·s or more are preferable. Those having melt viscosity at 380° C. of 5000 Pa·s or more are more preferable. Those having melt viscosity at 380° C. of 10000 Pas or more are even more preferable. As described above, when the melt viscosity is high, the non-hot metal processable component that is not fibrillated can stay in the knotted portion even when as the C component a hot melt processable component that is not fibrillated is melt during manufacture of a porous membrane so that the fibrillation can be suppressed.

Examples of the thermosetting resin include each resin of epoxy, silicone resin, polyester, polyurethane, polyimide, and phenol, for example. From the viewpoint of the workability of the co-coagulation described below, a resin dispersed in water in a non-cured state is preferably used as the thermosetting resin. All of those thermosetting resins can be obtained as a commercially available product.

The examples of the inorganic filler include talc, mica, calcium silicate, glass fiber, calcium carbonate, magnesium carbonate, carbon fiber, barium sulfate, calcium sulfate, or the like are. Among them, from the viewpoint of affinity with PTFE and specific gravity, talc is preferably used. From the viewpoint for forming stably dispersion during manufacture of the porous membrane, those having particle diameter of 3 to 20 μm are preferably used. All of those inorganic fillers can be obtained as a commercially available product.

The non-hot melt processable component can be a combination a plurality of components among the above described components.

The non-hot melt processable component that is not fibrillated is preferably contained at 1 to 50% by weight of the porous membrane. When the content of the non-hot melt processable component that is not fibrillated is 50% by weight or less, the fiber structure of the porous membrane can be maintained. The non-hot melt processable component that is not fibrillated is contained preferably at 20 to 40% by weight, and more preferably at 30% by weight. By containing it at 20 to 40% by weight, fibrillation of PTFE that can be fibrillated can be more effectively suppressed.

(c) Hot Melt Processable Component with Melting Point of Lower than 320° C. that is not Fibrillated The hot melt processable component with a melting point of lower than 320° C. that is not fibrillated (hereinbelow, also referred to as the hot melt processable component that is not fibrillated) has fluidity at melting so that it melts during the manufacture (drawing) of the porous membrane and can be hardened in the knotted portion, thus increasing the strength of the entire porous membrane. Accordingly, deterioration in filter performance can be suppressed when it is compressed during a post step. The hot melt processable component that is not fibrillated preferably exhibits the melt viscosity of less than 10000 Pa·s at 380° C. Meanwhile, the melting point of the hot melt processable component that is not fibrillated is obtained from a peak top in a diagram of latent heat of fusion, which is obtained by, by using differential scanning calorimetry (DSC), one complete melting by increasing the temperature at temperature increase rate of 10° C./minute to melting temperature or higher, cooling at 10° C./minute to melting temperature or lower, and increasing the temperature again at 10° C./minute.

Examples of the hot melt processable component that is not fibrillated include each resin of a hot melt processable fluoro polymer, polystyrene, polyethylene terephthalate (PET), polyester, polyamide, or a mixture thereof, and those capable of fully exhibiting melting property and fluidity at the drawing temperature for manufacturing the porous membrane can be mentioned. Among them, from the viewpoint of having excellent heat resistance at the drawing temperature for manufacturing the porous membrane and excellent chemical resistance, a hot melt processable fluoro polymer is preferable. Examples of the hot melt processable fluoro polymer include a fluoro polymer containing a copolymerization unit that is derived from at least one fluorinated ethylenically unsaturated monomer represented by the following general formula (2) or preferably two or more monomers $$RCF=CR_2 \qquad (2)$$

(in the formula, R each independently is selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms, and in such case, it is possible that all Rs are identical, any two Rs are identical and the remaining one R is different from them, or all Rs are different).

Useful examples of the compound represented by the general formula (2) include, although not limited thereto, perfluoroolefin such as fluoroethylene, VDF, trifluoroethylene, TFE, or HFP, chlorofluoroolefin such as CTFE or dichlorodifluoroethylene, (perfluoroalkyl)ethylene such as PFBE or PFHE, perfluoro-1,3-dioxol, and a mixture thereof.

It is also possible that the fluoropolymer contains a copolymer that is derived from copolymerization between at least one monomer represented by the above general formula (2) and
at least one copolymerizable comonomer represented by the above general formula (1) and/or general formula (3)

$$R_2C=CR_2 \qquad (3)$$

(in the formula, R each independently is selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms, and in such case, it is possible that all Rs are identical, any two Rs are identical and the remaining one R is different from them, or all Rs are different, in which different Rs can be different from each other when there are plural of them).

Useful examples of the compound represented by the general formula (1) include PAVE and preferred examples include PPVE and PMVE.

Useful examples of the compound represented by the general formula (3) include ethylene and propylene.

More specific examples of the fluoro polymer include polyfluoroethylene derived from polymerization of fluoroethylene, polyvinyldiene fluoride (PVDF) derived from polymerization of VDF, polychlorotrifluoroethylene (PCTFE) derived from polymerization of CTFE, a fluoro polymer derived from copolymerization of two or more different monomers represented by the above general formula (2), and a fluoro polymer derived from at least one monomer of the general formula (2) and at least one monomer represented by the general formula (1) and/or at least one monomer represented by the general formula (3).

Examples of the polymer include a polymer having a copolymer unit derived from VDF and HFP and a polymer derived from TFE and at least one copolymerizable comonomer (at least 3% by weight) other than TFE. Examples of the latter type of the fluoro polymer include TFE/PAVE copolymer (PFA), TFE/PAVE/CTFE copolymer, TFE/HFP copolymer (FEP), TFE/ethylene copolymer (ETFE), TFE/HFP/ethylene copolymer (EFEP), TFE/VDF copolymer, TFE/VDF/HFP copolymer, TFE/VDF/CTFE copolymer or the like, and a mixture thereof.

The hot melt processable component that is not fibrillated can be a component that is composed of a plurality of components in the above described components.

It is preferable that content of the hot melt processable component that is not fibrillated in the porous membrane is less than 0.1 to 20% by weight. When it is less than 20% by weight; it is surpressed that the hot melt processable component that is not fibrillated is dispersed in an area other than the knotted portion of the porous membrane and the pressure loss of the porous membrane becomes high. Further, it is easy to perform drawing at high ratio like elongation area ratio of 40 or more described below. When of the hot melt processable component that is not be fibrillated in the porous membrane is 0.1% by weight or more, a deterioration in filter performance of the porous membrane, which is caused by compressive force or the like during a post step, cannot be fully suppressed. Content of the hot melt processable component that is not fibrillated in the porous membrane is preferably 15% by weight or less, and more preferably 10% by weight or less. Further, content of the hot melt processable component that is not fibrillated in the porous membrane is, from the viewpoint of ensuring the strength of the porous membrane, preferably 0.5% by weight or more. It is particularly preferably 5% by weight or so.

The content of the hot melt processable component that is not fibrillated is preferably 10% by weight or less to have good drawing with elongation area ratio of 40 to 800.

The porous membrane preferably has the filling ratio of 1 to 20%, and more preferably 2 to 10%, in which the filling ratio is obtained by the following equation.

Filling ratio (%)={1−(Pore volume in porous membrane/Volume of porous membrane)}×100

In the aforementioned porous membrane composed of three components, the fibril is mainly composed of the component A, and the knotted portion is composed of the component A to component C. This knotted portion is formed in a relatively large size in a porous membrane, and a porous membrane with high thickness is formed accordingly. Furthermore, as the knotted portion contains a hot-melt processable component which cannot be fibrillated, it is relatively hard and it plays a role of pole to support the porous membrane in thickness direction. Thus, it can inhibit a decrease in filter performance of a porous membrane which is caused by application of compressive force in thickness direction during a post-process like lamination of an air permeable support or pleats processing which will be described later.

The porous membrane is produced by a method for producing a porous membrane which is included in the method for producing a filtering medium for an air filter described below.

With regard to the filtering medium 10 of the embodiment of the present invention, the first porous membrane 2 has a higher dust retention amount than the second porous membrane 3. As there is a difference in dust retention amount between the first porous membrane 2 and the second porous membrane 3, the dust retention amount is significantly increased while the dust collecting efficiency of the filtering medium 10 is maintained at high level. Meanwhile, the dust retention amount indicates a dust retention amount of a polyalphaolefin particle when air containing polyalphaolefin particle with count median diameter $D_{p50}$ of 0.25 μm is continuously blown at a flow rate of 5.3 cm/sec and the pressure loss is increased by 250 Pa. In the descriptions that are given below, it is also simply referred to as a dust retention amount. The count median diameter (it is described as either count median diameter (CMD) or number median diameter (NMD)) $D_{p50}$ indicates particle diameter which corresponds to 50% in the cumulative curve of particle size distribution. The count median diameter $D_{p50}$ can be measured by using, for example, a laser diffraction scattering type particle size distribution measurement device.

Comparison of the two membranes, that is, the porous membrane 2 and 3, in terms of dust retention amount can be carried out by using an average value of a dust retention amount which is measured at 10 to 50 points in one piece of a porous membrane. The dust retention amount at each measurement point is measured according to the protocols described below by using polyalphaolefin (PAO) particles. The difference in dust retention amount between the first porous membrane 2 and the second porous membrane 3 is not particularly limited. For example, the dust retention amount of the first porous membrane 2 is 25 to 35 g/m².

With regard to the filtering medium 10 of the embodiment of the present invention, it is preferable that the first porous membrane 2 has a lower pressure loss than the second porous membrane 3 and the second porous membrane 3 has a higher collecting efficiency than the first porous membrane 2. Accordingly, as the fine particles are not excessively captured by the first porous membrane 2 at the upstream side, some of the particles can pass through the downstream side and also sufficient collecting can be achieved by the second porous membrane 3 at the downstream side so that the collecting can be made, in the thickness direction, over the entire region of a filtering medium. Thus, an occurrence of early clogging in a layer on the upstream side can be avoided. Meanwhile, the pressure loss indicates a pressure loss when air is passed through at a flow rate of 5.3 cm/sec, and in the descriptions given below, it is also simply referred to as a pressure loss. The collecting efficiency indicates, unless specifically described otherwise, collecting efficiency of NaCl particle when air containing NaCl particle with particle diameter of 0.3 µm is passed through at a flow rate of 5.3 cm/sec. In the descriptions given below, it is also simply referred to as a collecting efficiency.

Comparison of a pressure loss between the two membranes, that is, the porous membrane 2 and 3, can be carried out by using an average value of a pressure loss which is measured at 10 to 50 points in one piece of a porous membrane, for example. The pressure loss at each measurement point is measured according to the protocols described below. The difference in pressure loss between the first porous membrane 2 and the second porous membrane 3 is not particularly limited. However, it is 10 to 130 Pa, for example. Furthermore, as for the pressure loss of each of the first porous membrane 2 and the second porous membrane 3, the first porous membrane 2 has a pressure loss of 30 to 90 Pa while the second porous membrane 3 has a pressure loss of 40 to 160 Pa.

Furthermore, comparison of collecting efficiency between the two membranes, that is, the porous membrane 2 and 3, can be carried out by using an average value of collecting efficiency which is measured at 10 to 50 points in one piece of a porous membrane, for example. The collecting efficiency at each measurement point is measured by the below-mentioned protocols by using NaCl particle with particle diameter of 0.3 µm. Extent of a difference in collecting efficiency between the first porous membrane 2 and the second porous membrane 3 is not particularly limited. For example, the collecting efficiency of the first porous membrane 2 is 95 to 99%.

With regard to the filtering medium 10 of the embodiment of the present invention, the average pore diameter is preferably more than 1.6 µm for the porous membrane 2 and 3, respectively. If it more preferable that the average pore diameter of the first porous membrane 2 is 3.0 to 3.9 µm and the average pore diameter of the second porous membrane 3 is more than 1.6 µm and less than 3.0 µm. Accordingly, the dust retention amount of the first porous membrane 2 can be increased compared to the dust retention amount of the second porous membrane 3 so that the dust retention amount of the filtering medium 10 can be easily increased. In the present specification, the average particle diameter is measured in view of ASTM F316-86. The average pore diameter is also referred to as an average flow path diameter.

Membrane thickness of the first porous membrane 2 is, from the viewpoint of enhancing the dust retention amount and collecting efficiency, preferably more than 10 µm, and more preferably more than 40 µm. Upper limit of the membrane thickness of the first porous membrane 2 is, although not particularly limited, 100 µm, for example. Furthermore, membrane thickness of the second porous membrane 3 is preferably more than 10 µm, and more preferably more than 40 µm when the second porous membrane 3 is composed of the three components that are described above, for example. Upper limit of the membrane thickness of the second porous membrane 3 is, although not particularly limited, 100 µm, for example.

(2. Air Permeable Support)

The filtering medium 10 is provided with two pieces of an air permeable support 4, in which each supports the first porous membrane 2 and the second porous membrane 3 and is disposed to form an outermost layer of a filtering medium, that is, the most upstream side and the most downstream side.

Materials and structure of the air permeable support 4 are not particularly limited. However, a non-woven fabric, a woven fabric, metal mesh, resin net, or the like are used. Among them, from the viewpoint of strength, collecting property, flexibility, and workability, a non-woven fabric having heat fusion property is preferable. As for the non-woven fabric, a non-woven fabric in which part or all of the constitutional fiber has a core/sheath structure, a two-layer non-woven fabric consisting of a fiber layer which is composed of a low melting point material and a fiber layer which is composed of a high melting point material, or a non-woven fabric of which surface is coated with a heat fusion resin is preferable. In the non-woven fabric with a core/sheath structure, the core component preferably has higher melting point than the sheath component. Examples of a combination of each material for core/sheath include PET/PE and polyester with high melting point/polyester with low melting point. Examples of a combination of a low melting point material and a high melting point material for the two-layer non-woven fabric include PE/PET, PP/PET, PBT/PET, and PET with low melting point/PET with high melting point. Examples of the non-woven fabric of which surface is coated with a heat fusion resin include a PET non-woven fabric coated with EVA (ethylene vinyl acetate copolymer resin) and a PET non-woven fabric coated with olefin resin.

Materials of a non-woven fabric are not particularly limited, and examples thereof which may be used include polyolefin (PE, PP, or the like), polyamide, polyester (PET or the like), aromatic polyamide, and a composite material thereof. The air permeable support 4 can be attached to the first porous membrane 2 and the second porous membrane 3 by taking advantage of an anchoring effect which is caused by partial metaling of the air permeable support 4 according to heating or melting of a hot melt resin, or adhesion with a reactive adhesive or the like.

Two pieces of the air permeable support 4 may be the same type or a different type.

(3. Filtering Medium)

The pressure loss of the filtering medium 10 is less than 200 Pa, and preferably 70 to 190 Pa. As the pressure loss of the filtering medium 10 is within this range, it is suppressed at relative low level compared to a HEPA filter composed of a glass filtering medium, and even when compared to a filtering medium provided with two pieces of PTFE porous membrane which is composed of one component, the pressure loss of the filtering medium 10 is suppressed at low level. The pressure loss within the above range can be obtained by using a first porous membrane and a second porous membrane which have the average pore diameter and membrane thickness each in the aforementioned range.

The collecting efficiency of the filtering medium 10 is 99.97% or more. A filtering medium satisfying this collecting efficiency can be used as a filter of HEPA grade. The collecting efficiency within the above range can be obtained by using a first porous membrane and a second porous membrane which have the average pore diameter and membrane thickness each in the aforementioned range.

The dust retention amount of the filtering medium 10 is 25 $g/m^2$ or more. According to the filtering medium of the embodiment of the present invention, the dust retention amount is significantly enhanced while a balance between the collecting efficiency and pressure loss is maintained at high level, and the enhancement is such that the dust retention amount is the same or higher than that of a glass filtering medium. The dust retention amount within this range can be obtained by using a first porous membrane and a second porous membrane which has the average pore diameter and membrane thickness each in the aforementioned range.

The PF value of the filtering medium 10 is 18 or more, for example. It is preferably 23 or more. Upper limit of the PF value is not particularly limited, but it is 40, for example, and preferably 35.

In the above Patent Literature 1, a filtering medium having two identical porous membranes overlaid on top of each other is described. According to this filtering medium, the dust retention amount is improved but it is still lower than the dust retention amount of a glass filtering medium. Accordingly, to increase the dust retention amount of a filtering medium as a whole, it may be considered that, for example, a new porous membrane is prepared by a method like increasing the average pore diameter of a porous membrane, lowering the filling ratio, or increasing the thickness or the like, followed by overlaying two pieces of the membrane. However, in such case, the collecting efficiency is deteriorated due to such modification, and there may be a problem of losing the HEPA grade.

According to the studies by the inventors of the present invention, it was found that, by overlaying two pieces of a porous membrane having a difference in dust retention amount, the dust retention amount of a filtering medium as a whole is significantly enhanced while maintaining the HEPA grade, and it is improved to the level which is the same or higher than that of a glass filtering medium. The filtering medium of the embodiment of the present invention has two pieces of a porous membrane allowing that the pressure loss of a filtering medium as a whole is less than 200 Pa, and the dust retention amount is increased to 25 g/m$^2$ or more while the collecting efficiency is maintained at 99.97% or more.

Meanwhile, the filtering medium of the embodiment of the present invention is not limited to the four layer structure described above, and it may be a filtering medium 11 with five layer structure which is illustrated in FIG. 1B. In the example illustrated in FIG. 1B, the filtering medium 11 is composed of the first porous membrane 2, the second porous membrane 3, and 3 pieces of the air permeable support 4, in which 1 piece of the air permeable support 4 is disposed between the first porous membrane 2 and the second porous membrane 3. All of the first porous membrane 2, the second porous membrane 3, and the air permeable support 4 are the same as the first porous membrane 2, the second porous membrane 3, and the air permeable support 4 of the filtering medium 10 of FIG. 1A.

Even in the filtering medium 11 with five layer structure of FIG. 1B, the first porous membrane 2 and the second porous membrane 3 having a difference in pressure loss are overlaid on top of each other in air stream direction, and dust retention amount is increased to 25 g/m$^2$ or more while the collecting efficiency is maintained at 99.97% or more.

Number of the porous membranes that are used for a filtering medium of the embodiment of the present invention is not limited to 2, and it may be 3 or more. In such case, plural porous membranes are preferably disposed such that the extent of a pressure loss decreases in order from the downstream side to the upstream side of an air stream.

The filtering medium of the embodiment is used for the following use, for example.

A field of ULPA filter (Ultra low Penetration Air Filter) (for manufacturing a semiconductor), a HEPA filter (for hospital use or manufacturing a semiconductor), a columnar cartridge (for industrial use), a bug filter (for industrial use), a heat resistant bug filer (for treating discharge gas), a heat resistant pleats filter (for treating discharge gas), SINBRAN (registered trademark) filter (for industrial use), a catalyst filter (for treating discharge gas), a filter having adsorbent (for use inside HDD (Hard Disk Drive)), a bent filter having adsorbent (for use inside HDD), a bent filter (for use inside HDD), a filter for vacuum cleaner (for use in a vacuum cleaner), a universal multilayer felt medium, a cartridge filter for Gas turbine (Gire-Tournois) (for use in Gas turbine compatible product), and a cooling filter (for use in casing of electronic device);

A material for freeze drying like a container for freeze drying, a ventilation material for an electronic circuit or a lamp of an automobile, a use for container such as cap of a container, a use for protection and a field of ventilation and inner pressure adjustment including a ventilation of an electronic device, and a use for ventilation in medical use; and A field of liquid filtration such as a filter for filtering semiconductor liquid (for manufacturing a semiconductor), a hydrophilic filter (for manufacturing a semiconductor), a filter for chemical reagent (for treating chemical liquid), a filter for pure water manufacturing line (for manufacturing pure water), and a filter for reverse washing type liquid filtration (for treating industrial waste water).

(Variation Example)

Figure 2A:
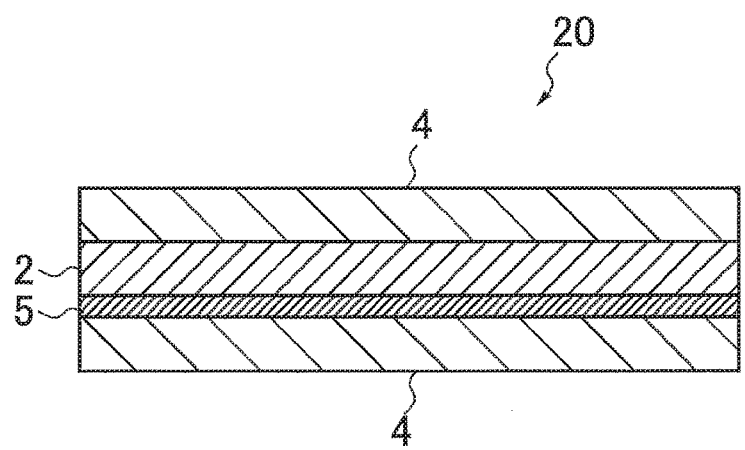
FIG. 2A is a cross-sectional view illustrating the layer configuration of a filtering medium with four layer structure according to a variation example of the embodiment of the present invention.
Figure 2B:
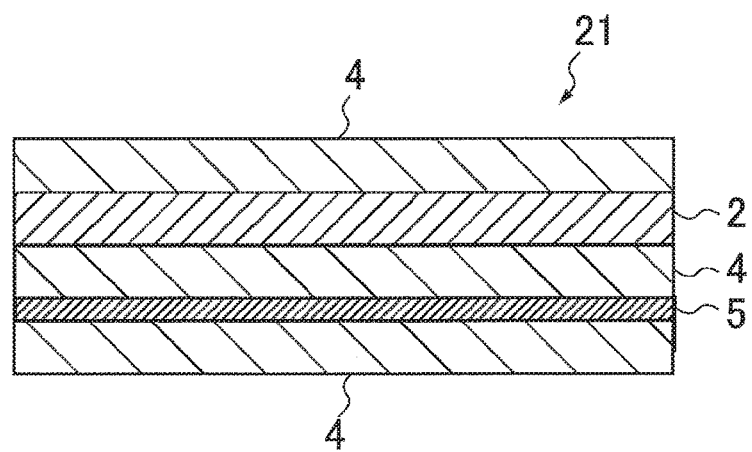
FIG. 2B is a cross-sectional view illustrating the layer configuration of a filtering medium with five layer structure according to a variation example of the embodiment of the present invention.

Next, in view of FIGS. 2A and 2B, the variation example of the embodiment of the present invention is described.

FIG. 2A is a cross-sectional view illustrating the layer configuration of a filtering medium 20 with four layer structure according to a variation example. FIG. 2B is a cross-sectional view illustrating the layer configuration of a filtering medium 21 with five layer structure according to a variation example.

Those variation examples are characterized in that a PTFE porous membrane is used as the second porous membrane 5. As for the PTFE porous membrane, a publicly well known membrane can be used without any particular limitation. For example, a PTFE porous membrane having dust retention amount of 3 to 9 g/m$^2$, collecting efficiency of 90 to 99.9999%, and pressure loss of 40 to 170 Pa can be used. Comparison of the first porous membrane 2 with the second porous membrane 5 in terms of dust retention amount, pressure loss, and collecting efficiency can be carried out in the same manner as the description given for the filtering medium illustrated in FIGS. 1A and 1B. Extent of difference in dust retention amount, pressure loss, and collecting efficiency between the first porous membrane 2 and the second porous membrane 5 is not particularly limited.

Preferred range of each value of dust retention amount, pressure loss, collecting efficiency, average pore diameter, and membrane thickness of the first porous membrane 2 is the same as those illustrated for the filtering medium illustrated in FIGS. 1A and 1B.

The average pore diameter of the second porous membrane 5 is preferably more than 0.2 μm, and more preferably 0.3 to 1.0 μm. Furthermore, the membrane thickness of the second porous membrane 5 is more than 5 μm and preferably more than 10 μm.

Like the filtering medium 20 and 21 of the variation example and the filtering medium 10 and 11 illustrated in FIGS. 1A and 1B, as there is a difference in dust retention amount between two membrane of the porous membrane 2 and 5, the dust retention amount is increased such that it is the same or higher than that of a glass filtering medium while high collecting efficiency is maintained. Furthermore, for a case in which, as the second porous membrane 5, a PTFE porous membrane with collecting efficiency of 99.995% or more if a particle with particle size of 0.1 μm is used, it is possible for the filtering medium as a whole to have the collecting efficiency that is as high as a ULPA filter and the dust retention amount can be increased significantly.
(Filter Pack)

Figure 3:
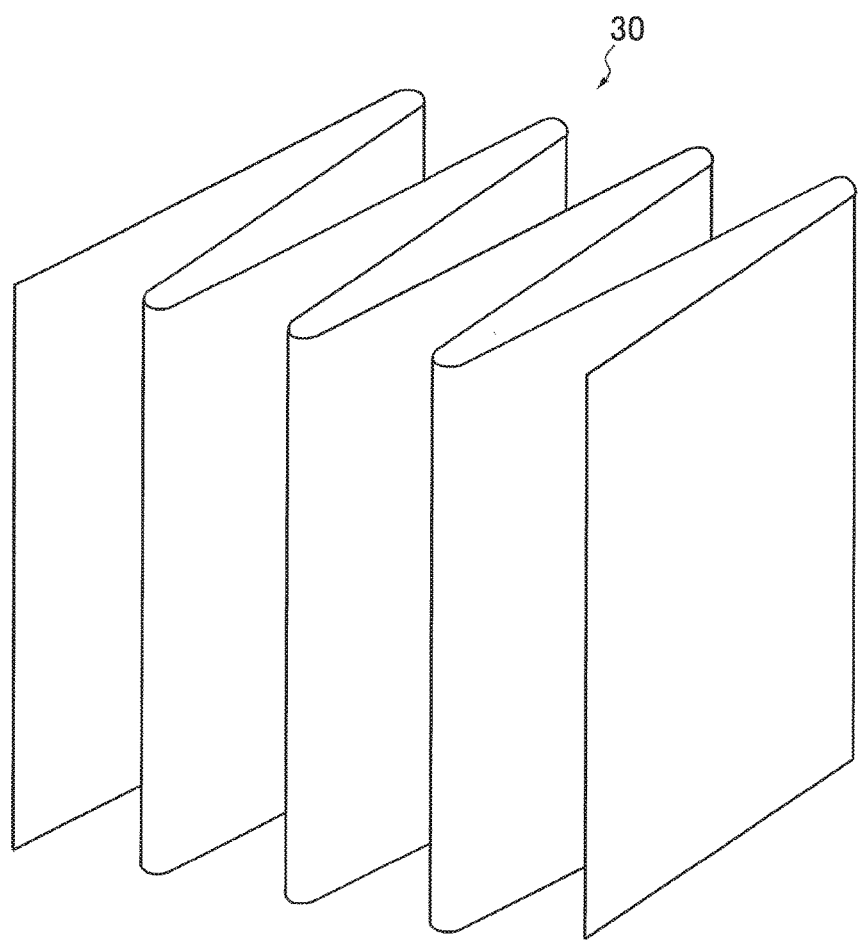
FIG. 3 is an external perspective view of the filter pack of the embodiment of the present invention.

Next, the filter pack of the embodiment of the present invention is described in view of FIG. 3.

FIG. 3 is an external perspective view of the filter pack 30 of the embodiment of the present invention.

The filter pack 30 is provided with the aforementioned filtering medium for an air filter. The filtering medium for an air filter of the filter pack 30 is a processed filtering medium which has been processed to have a zigzag shape in which outside folding and inside folding are repeated alternately (pleats processing). The pleats processing can be performed by using, for example, a rotary type folding machine. The folding width of a filtering medium is not particularly limited, but it is 25 mm to 280 mm, for example. As the filter pack 30 is prepared with pleats processing, the insertion area of a folded filtering medium can be increased when it is used for an air filter unit, and accordingly, an air filter unit with high collecting efficiency can be obtained.

In addition to a filtering medium, the filter pack 30 may be additionally provided with a spacer (not illustrated in the drawing) to maintain pleats interval when it is used for an air filter unit. The material of a spacer is not particularly limited. However, a hot-melt resin may be preferably used.
(Air Filter Unit)

Figure 4:
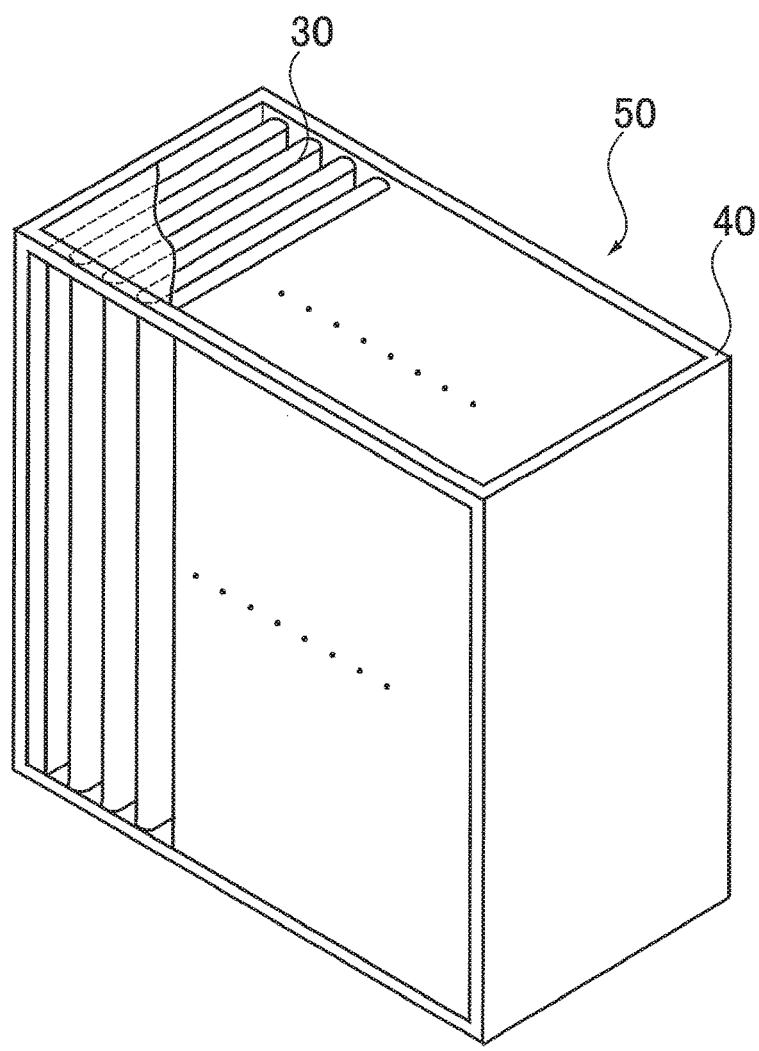
FIG. 4 is an external perspective view of the air filter unit of the embodiment of the present invention.

Next, an air filter unit 50 of the embodiment of the present invention is described in view of FIG. 4.

FIG. 4 is an external perspective view of the air filter unit 50 of the embodiment of the present invention.

The air filter unit 50 is provided with the aforementioned filtering medium for an air filter or filter pack and a frame body 40 to support the filtering medium for an air filter or filter pack. In other words, the air filter unit may be produced by supporting a filtering medium on a frame body, or it may be produced by supporting the filter pack 30 on the frame body 40. The air filter unit 50 illustrated in FIG. 4 is produced by using the filter pack 30 and the frame body 40.

The frame body 40 is prepared by combining a plate material or by molding a resin, for example, and the gap between the filter pack 30 and the frame body 40 is sealed by a sealing agent. The sealing agent is to prevent a leak between the filter pack 30 and the frame body 40, and an agent made of resin such as epoxy, acryl, or urethane based resin is used. The air filter unit 50 provided with the filter pack 30 and the frame body 40 may be a mini pleats type air filter unit in which one filter pack 30 extended in flat plate shape is supported such that it is encased inside the frame body 40, or a V bank type air filter unit or a single header type air filter unit in which plural filter packs that are extended in flat plate shape are arranged and supported on a frame body.

Meanwhile, the air filter unit provided with a filtering medium and a frame body may be a separator type air filter unit which is produced by having a wave-like shape according to folding inward and backward a filtering medium, and disposing corrugation-processed separator in a valley part which is formed by folding inward and backward a filtering medium.
(Method for Producing Filtering Medium for Air Filter)

Next, the method for producing a filtering medium for an air filter of the embodiment of the present invention is described.

The method for producing a filtering medium for an air filter to capture fine particles in the air of the embodiment of the present invention is characterized by having the step as follows:

(a) a step for preparing a first porous membrane by using a fluororesin and a liquid lubricant;

(b) a step for preparing a second porous membrane to have smaller average pore diameter than the first porous membrane by using a fluororesin and a liquid lubricant; and (c) a step for producing a filtering medium for an air filter by laminating the first porous membrane, the second porous membrane, and plural air permeable supports which support the first porous membrane and the second porous membrane.

In the step (c), the plural air permeable supports are disposed such that they form at least the outermost layer of the filtering medium for an air filter. Furthermore, the filtering medium for an air filter which is produced by this method has, like the filtering medium for an air filter described above, a pressure loss of less than 200 Pa, collecting efficiency of 99.97% or more, and dust retention amount of 25 g/m$^2$ or more.

As for the fluororesin which is used for the step (a) and the step (b), the same fluororesin as the resin used for the aforementioned filtering medium for an air filter can be used. Meanwhile, the first porous membrane and the second porous membrane can be prepared by additionally using a component which is different from the fluororesin.

Herein, descriptions are given for the method for producing a first porous membrane by using the aforementioned 3 kinds of component in the step (a). The method described herein can be also applied for preparation of a second porous membrane by using those 3 kinds of component in the step (b), except that the liquid lubricant is used in an amount which is different from the amount of a liquid lubricant used in the step (a).

Form of 3 kinds of component of A to C described above is, although not particularly limited, a composition, mixed powder, or material for molding. First, the composition, mixed powder, and material for molding which became material of the porous membrane are described.

The composition, mixed powder, material for molding all contain the component A, the component B, and the component C, and the component C is contained at being equal to or greater than 0.1% but less than 20% by weight. Each of the component A, the component B, and the component C is the same as the PTFE that can be fibrillated, the non-hot melt processable component that is not fibrillated, and the hot melt processable component that is not fibrillated that are described above with respect to the porous membrane, respectively.

The material for molding is, for example, a material for molding a porous membrane which is used for a filtering medium for a filter to capture fine particles in gas.

Form of the material of the porous membrane can be the mixed powder described below, it can be a mixture instead of powder, or it can be the material for molding described below. As for the mixed powder, the fine powder obtained by co-coagulation that is used in the following example, powder obtained by mixing two kinds of the three materials by co-coagulation and mixing the remaining one kind of the component by using a mixer, and powder obtained by mixing three materials by using a mixer can be mentioned. Examples of a mixture not in powder form include a molded article like a porous body (for example, the porous membrane) and an aqueous dispersion containing the three kinds of the component.

The material for molding indicates those obtained after adjustment for processing to mold the composition and examples thereof include those added with a processing aid (liquid lubricant or the like), those with adjusted particle size, and those obtained after preliminary molding. The material for molding may include, in addition to the aforementioned three components, a well-known additive or the like. Examples of the well-known additive include a carbon material such as carbon nanotube or carbon black, a pigment, a photocatalyst, activated carbon, an anti-microbial agent, an adsorbent, and a deodorant.

The composition can be manufactured by various methods. For example, when the composition is mixed powder, it can be manufactured by a method in which powder of the component A, powder of the component B, and powder of the component C are mixed by a common mixer or the like, a method in which co-coagulated powder is obtained by co-coagulating three aqueous dispersions each containing the component A, the component B, and the component C, (that is, the step a) described above), or a method of mixing mixed powder which is obtained by co-coagulating in advance an aqueous dispersion containing any two components of the component A, the component B, and the component C with powder of the remaining one components using a common mixer. Among them, from the viewpoint of easily and homogeneously dispersing three different components, the composition is preferably obtained by co-coagulating three aqueous dispersions each containing the component A, the component B, and the component C.

The size of the mixed powder obtained by co-coagulation is not particularly limited, but the average particle diameter is 100 to 1000 μm, for example. Preferably, it is 300 to 800 μm. In that case, the average particle diameter is measured on the basis of JIS K6891. The apparent density of the mixed powder that is obtained by co-coagulation is not particularly limited. However, it is preferably 0.40 to 0.60 g/ml, and more preferably 0.45 to 0.55 g/ml. The apparent density is measured on the basis of JIS K6892.

Examples of the co-coagulation include the followings:

(i) a method in which an aqueous dispersion of the component A, an aqueous dispersion of the component B, and an aqueous dispersion of the component C are co-coagulated after mixing, (ii) a method in which an aqueous dispersion of any one of the component A, component B, and component C is added with powder of the remaining two components followed by co-coagulation, (iii) a method in which powder of any one of the component A, component B, and component C is added to a mixed aqueous dispersion in which aqueous dispersions of the remaining two components are mixed followed by co-coagulation, and (iv) a method in which mixed powder of any two components, which is obtained by mixing each aqueous dispersion of any two components of the component A, component B, and component C followed by co-coagulation to an aqueous dispersion of the remaining one component followed by co-coagulation.

With regard to the method for co-coagulation, from the viewpoint of easy and homogeneous dispersion of the three components, the method of (i) above is preferable.

For the co-coagulation of the methods (i) to (iv) described above, the co-coagulation is preferably performed by adding any one of an acid such as nitric acid, hydrochloric acid, or sulfuric acid; a metal salt such as magnesium chloride, calcium chloride, sodium chloride, aluminum sulfate, magnesium sulfate, barium sulfate, sodium hydrogen carbonate, or sodium carbonate; and an organic solvent such as acetone or methanol.

The shape of the component A before mixing is not particularly limited, and it can be an aqueous dispersion liquid or powder of the PTFE that can be fibrillated as described above. Examples of the powder include (in particular, fine powder described above) include "TEFLON 6-J" (hereinbelow, "TEFLON" is a registered trademark), "TEFLON 6C-J", "TEFLON 62-J" or the like that are manufactured by Du Pont-Mitsui Fluorochemicals Co., Ltd., "POLYFLON F106", "POLYFLON F104", "POLYFLON F201", "POLYFLON F302" or the like that are manufactured by Daikin Industries, Ltd., "FLUON CD123", "FLUON CD1", "FLUON CD141", "FLUON CD145" or the like that are manufactured by Asahi Glass Co., Ltd., and "TEFLON 60", "TEFLON 60 X", "TEFLON 601A", "TEFLON 601 X", "TEFLON 613A", "TEFLON 613A X", "TEFLON 605XT X", "TEFLON 669 X" or the like manufactured by Du Pont.

The fine powder can be obtained by co-coagulation and drying of an aqueous dispersion of the PTFE that can be fibrillated, which is obtained by emulsion polymerization of TFE (that is, aqueous dispersion after finishing polymerization). Examples of the aqueous dispersion of the PTFE that can be fibrillated include an aqueous dispersion after finishing the polymerization described above or an aqueous dispersion that is commercially available. As for the preferred method for producing an aqueous dispersion of the PTFE that can be fibrillated, which is obtained after finishing the polymerization, include a production method described in the publications that are listed above in relation to disclosure of the homo PTFE. Examples of the commercially available aqueous dispersion of the PTFE that can be fibrillated include aqueous dispersions such as "POLYFLON D-110", "POLYFLON D-210", "POLYFLON D-210C", "POLYFLON D-310" or the like that are manufactured by Daikin Industries, Ltd., "TEFLON 31-JR", "TEFLON 34-JR" or the like that are manufactured by Du Pont-Mitsui Fluorochemicals Co., Ltd., or "FLUON AD911L", "FLUON AD912L", "AD938L" or the like that are manufactured by Asahi Glass Co., Ltd. Because all of the commercially available aqueous dispersion of the PTFE that can be fibrillated is added with 2 to 10 parts by weight of a non-ionic surfactant relative to 100 parts by weight of PTFE in the aqueous dispersion to maintain the stability, the non-ionic surfactant may easily remain in the mixed powder which is obtained by co-coagulation, and thus it is likely to have a potential problem like coloration of a porous body. For such reasons, an aqueous dispersion obtained after finishing the polymerization is preferred as an aqueous dispersion of the PTFE that can be fibrillated.

The shape of the component B before mixing is not particularly limited, but when the component B is low molecular weight PTFE, it can be an aqueous dispersion or powder (generally referred to as PTFE micropowder or micropowder). Examples of the powder of the low molecular weight PTFE include "MP1300-J" or the like that are manufactured by Du Pont-Mitsui Fluorochemicals Co., Ltd., "LUBRON L-5", "LUBRON L-5F" or the like that are manufactured by Daikin Industries, Ltd., "FLUON L169J", "FLUON L170J", "FLUON L172J" or the like that are manufactured by Asahi Glass Co., Ltd., and "KTL-F", "KTL-500F" or the like manufactured by Kitamura Limited.

The aqueous dispersion of the low molecular weight PTFE can be an aqueous dispersion after finishing the polymerization of the TFE as obtained by emulsion polymerization or an aqueous dispersion that is commercially available. Further, those obtained by dispersing micro powder in water by using a surfactant or the like can be also used. As for the preferred method for producing an aqueous dispersion of the PTFE that can be fibrillated, after finishing the polymerization, include a production method described in JP 7-165828 A, JP 10-147617 A, JP 2006-063140 A, JP 2009-1745 A, WO 2009/020187 A or the like. Examples of the commercially available aqueous dispersion of the PTFE that can be fibrillated include aqueous dispersions such as "LUBRON LDW-410" or the like that are manufactured by Daikin Industries, Ltd. Because the commercially available aqueous dispersion of the low molecular weight PTFE is added with 2 to 10 parts by weight of a non-ionic surfactant relative to 100 parts by weight of PTFE in the aqueous dispersion to maintain the stability, the non-ionic surfactant may easily remain in the mixed powder which is obtained by co-coagulation, and thus it is likely to have a potential problem like coloration of a porous body. For such reasons, an aqueous dispersion obtained after finishing the polymerization is preferred as an aqueous dispersion of the low molecular weight PTFE.

Further, even when an inorganic filler is used as the component B, it is preferably an aqueous dispersion, although the shape before mixing is not particularly limited. Examples of the inorganic filler include "TALC p2" manufactured by Nippon Talc Co., Ltd. and "LMR-100" manufactured by Fuji Talc Industrial Co., Ltd. They are used by dispersing powder in water after suitably performing a surface treatment using a silane coupling agent or the like. Among them, from the viewpoint of dispersibility in water, the secondary crushed product obtained by a jet mill (for example, "TALC P2") is preferably used.

Examples of the component C include, in addition to a fluororesin such as FEP or PFA, various resins like, acryl, urethane, and PET. The shape before mixing is not particularly limited, but it is preferably an aqueous dispersion. As for the aqueous dispersion, in case of a resin obtained by emulsion polymerization, resin powder dispersed in water by using a surfactant or the like can be also used in addition to a dispersion which is directly usable after finishing polymerization. The component C is prepared as an aqueous dispersion by dispersing a pre-determined amount in water such that it is contained at 0.1% or more but less than 20% by weight in a porous membrane.

The method for co-coagulation is not particularly limited. However, it is preferable to apply mechanical stirring force after mixing three aqueous dispersions.

After the co-coagulation, an liquid lubricant (that is, extrusion aid) is mixed after performing dehydration and drying, followed by extrusion. The liquid lubricant is not particularly limited if it is capable of wetting the surface of PTFE powder and can be removed after molding the mixture obtained by co-coagulation into a film shape. Examples thereof include hydrocarbon oil such as fluid paraffin, naphtha, white oil, toluene, or xylene, alcohols, ketones, and esters or the like.

The mixture obtained by co-coagulation is, after mixing with a liquid lubricant, extruded and rolled by a conventionally known method to be molded into a film-shaped product. The extrusion can be performed by paste extrusion, ram extrusion, or the like. Preferably, it is performed by paste extrusion. The sheet shape extrudate extruded by paste extrusion is rolled under heating by using a calendar roll or the like under temperature condition of 40° C. to 80° C., for example. The thickness of the obtained rolled product in film shape is set based on the desired thickness of the porous membrane, and it is generally between 100 and 400 μm.

Next, the liquid lubricant is removed from the unsintered film as a rolled product. The removal of the liquid lubricant is performed by heating or extraction or a combination of them. The heating temperature for the heating method is not particularly limited if it is lower than the melting point of the hot melt processable component that is not fibrillated. It is 100 to 250° C., for example.

The rolled product from which the liquid lubricant is removed is drawn at the temperature which is equal to or higher than the melting temperature of the hot melt processable component that is not fibrillated but is equal to or lower than the decomposition temperature of the non-hot melt processable component that is not fibrillated. During this process, the hot melt processable component that is not fibrillated is melt and later hardened in the knotted portion, and thus the strength of the porous membrane is increased in the thickness direction. The temperature for drawing can be set depending on the temperature of a furnace in which the drawing is performed or the temperature of a heating roller for returning the rolled product. Alternatively, it may be realized by combining those settings.

The drawing includes drawing in the first direction and drawing in the second direction which is perpendicular to the first direction. When the porous membrane is used for a filtering medium that is embossed for an air filter, it is preferable to perform also the drawing in the second direction. In this embodiment, the first direction indicates the length direction of a rolled product (that is, longitudinal direction) and the second direction indicates the width direction of a rolled product (that is, horizontal direction).

The rolled product is drawn at elongation area ratio of 40 to 800 times. The drawing rate in the first direction is preferably 10 to 600%/second, and more preferably 10 to 150%/second. The temperature at the time of drawing is preferably 200 to 350° C., and more preferably 280 to 310° C.

The drawing rate in the second direction is preferably 10 to 600%/second. The temperature at the time of drawing is preferably 200 to 400° C., and more preferably 250 to 350° C. The drawing in the second direction can be performed either simultaneously or separately with the drawing in the first direction.

With regard to the drawing of a rolled product (also referred to as unsintered fluororesin product), the temperature, drawing ratio, and drawing rate at the time of drawing are known to have an effect on the physical properties of a drawn product. The S-S curve of the unsintered fluororesin product (that is, graph illustrating the relationship between tensile strength and elongation) exhibits specific characteristics that are different from those of other resins. In general, the resin material illustrates increased tensile strength in accordance with elongation. The range of elastic range, break point, and the like vary depending on materials and conditions for evaluation. However, it is very common that the tensile strength exhibits increasing tendency in accordance with the elongation amount. On the other hand, the tensile strength of the unsintered fluororesin product exhibits a gradual decrease tendency after illustrating a peak at a certain elongation amount. It represents the presence of a "region in which an undrawn part becomes stronger than a drawn part" in an unsintered fluororesin product.

When it is translated in terms of the behavior during drawing, the weakest part in a drawing plane starts to elongate during drawing, and as the drawn part becomes stronger than the undrawn part, the next weakest undrawn part is drawn and so on. As a result, the drawn region is broadened to yield overall drawing. Meanwhile, in case of the unsintered fluororesin product, when the part about to elongate reaches the "region in which an undrawn part becomes stronger than a drawn part", the part which is already elongated is further drawn, and as a result, the undrawn part remains as a node (that is, knotted portion, undrawn part). As the drawing rate becomes slow, this phenomenon becomes more significant, leaving a larger node (that is, knotted portion, undrawn part). By using this phenomenon during drawing, controlling the physical properties of a drawn product is performed depending on various uses.

According to this embodiment, it is more preferable to obtain a drawn product with lower density, and it is effective for applying the low drawing rate to the first drawing, in particular. Herein, when it is desired to obtain a molded product with low filling ratio while keeping a large node (that is, knotted portion, undrawn part), it is necessary that the drawing rate of the first drawing is 150%/second or less, and preferably 80%/second or less and the drawing in the second direction is 500%/second or less when conventional PTFE is used only as a raw material. However, the structure of the molded article with low filling ratio, which is obtained as above, is easily damaged by external force.

In this embodiment, due to the presence of the non-hot melt processable component that is not fibrillated, the above phenomenon caused by low drawing rate becomes more significant. As a result, as a range of applicable drawing rate, the drawing rate of the first drawing can be increased to 600%/second or less, and preferably 150%/second or less, and the drawing rate in the second direction can be increased to 600%/second or less. Further, due to the presence of the hot melt processable component that is not fibrillated, it is possible to maintain the structure even after the post processing.

It is preferable that the porous membrane obtained accordingly is thermally fixed to obtain mechanical strength or dimensional stability. The temperature for thermal fixing can be equal to or higher than the melting temperature of PTFE, or lower than the melting temperature of PTFE, and it is preferably 250 to 400° C.

Meanwhile, if a PTFE porous membrane is to be prepared as a second porous membrane in the step (b), a known method can be used.

The difference between the amount of liquid lubricant which is used in the step (a) relative to 100 parts by weight of fluororesin and the amount of liquid lubricant which is used in the step (b) relative to 100 parts by weight of fluororesin (difference in the amount of liquid lubricant or difference in amount of aid) is preferably 1 to 4 parts by weight. When the amount of aid is 1 part by weight or more, a suitable difference in average pore diameter can be generated between two porous membranes. When the amount of aid is 4 parts by weight or less, deterioration of homogeneous drawing property can be suppressed. The homogeneous drawing property indicates that, as there is little deviation in collecting efficiency, pressure loss, or the like in a porous membrane prepared by drawing processing, those properties are homogeneously exhibited all over the porous membrane. The difference in the liquid lubricant amount is 2 parts by weight, for example.

The amount of the liquid lubricant used in the step (a) and the step (b) is, relative to 100 parts by weight of the fluororesin, 30 to 37 parts by weight for each. By using it in an amount of 30 parts by weight or more, the pressure loss can be reduced and the pressure loss of a filtering medium as a whole can be adjusted to be less than 200 Pa. Furthermore, by using it in an amount of 37 parts by weight or less, it is possible to ensure the molding property of an unsintered tape which is described below. It is also possible to suppress the influence of fine particles, which pass through the downstream side as being not captured due to excessively large pore diameter of a porous membrane, on the second porous membrane on the downstream side.

The amount of the liquid lubricant which is used in the step (a) is, for example, 34 to 36 parts by weight relative to 100 parts by weight of the fluororesin. For example, while it is used in an amount of 31 parts by weight or more but less than 34 parts by weight for preparing the second porous membrane while it is used in an amount of 34 parts by weight or more but less than 36 parts by weight for preparing the first porous membrane within a range in which the difference in liquid lubricant amount of 1 to 4 parts by weight is satisfied, the dust retention amount of a filtering medium can be dramatically increased.

The first porous membrane and the second porous membrane can be prepared by, using a known method, preparing a non-sintered film (hereinbelow, also referred to as an unsintered tape) and biaxially drawing it thereafter.

In the step (b), the second porous membrane is prepared to have a smaller average pore diameter than the first porous membrane. According to the studies by the inventors of the present invention, it was found that, when a filtering medium is produced by overlaying the first porous membrane with the second porous membrane, which has been prepared to have a smaller average pore diameter than the first porous membrane, the dust retention amount of a filtering medium can be significantly increased while the high collecting efficiency is maintained. It was found that having a smaller average particle diameter of a second porous membrane than a first porous membrane can be achieved by slightly increasing, during preparation of the first porous membrane, the amount of a liquid lubricant per unit weight of a fluororesin that is used for the second porous membrane (amount of aid). From this point of view, in the step (b), it is preferable to use, in terms of the amount per unit weight of a fluororesin, a less amount of the liquid lubricant than the amount of the liquid lubricant used in the step (a). It was also found out by the studies by the inventors of the present invention that creating a difference in the average pore diameter between two porous membranes can be also achieved by having a different blending ratio of the aforementioned 3 components between two pieces of the porous membrane.

In the step (c), the mode for laminating two porous membranes and plural air permeable supports is not particularly limited.

The filtering medium 10 with four layer structure illustrated in FIG. 1A can be produced by preparing separately two unsintered tapes which become two pieces of the porous membrane, drying them separately, overlaying them on top of each other, and performing biaxial drawing (vertical drawing and horizontal drawing). In that case, the first porous membrane and the second porous membrane are heated every time the drawing is performed in overlay state. Because the heating is applied 2 times in total, the two pieces of the porous membrane are attached well to each other, and boundary peeling or the like of the two porous membranes which is caused by following processing is inhibited.

Furthermore, instead of the method described above, the filtering medium 10 with four layer structure can be also produced by, after vertical drawing, overlaying two pieces of film to become two porous membranes and performing horizontal drawing of them.

The filtering medium 11 with five layer structure illustrated in FIG. 1B can be produced by, for example, preparing separately two porous membranes, laminating two pieces of air permeable support by using one piece of those porous membranes and two pieces of air permeable support such that the porous membrane is disposed between the two supports to give a filtering medium with three layer structure, and laminating the remaining porous membrane on the filtering medium with three layer structure while performing horizontal drawing. Furthermore, instead of this method, the production can be made with two porous membranes and three pieces of air permeable support by using a machine for attachment.

As described above, it is believed that the reason for having a high dust retention amount is based on a flow of fine particles to the downstream side which is caused by having increased average pore diameter of the first porous membrane than the second porous membrane. Herein, although there is a report that the pressure loss can be reduced by increasing the amount of aid, the relationship between the amount of aid and dust retention amount remains unclear. It was found out by the inventors of the present invention that the dust retention amount can be unexpectedly increased if the amount of aid is increased. It is believed that the reason for having such increased dust retention amount is based on increased average pore diameter of the first porous membrane on the upstream side, yielding a loose structure (specifically, 3.0 to 3.9 µm), and thus the fine particles can pass through the filtering medium in depth (thickness) direction and the collecting can be achieved in a broader range in thickness direction of the filtering medium. In particular, it is believed that, for a case in which the first porous membrane and the second porous membrane that are prepared by the aforementioned 3 components are used, the thickness may be increased so that the region in thickness direction in which the collecting can be made is ensured and a higher dust retention amount is obtained.

EXAMPLES

Hereinbelow, the present invention is specifically described by way of examples.
(1) Preparation and Evaluation of the Porous Membrane and the Filtering Medium Example 1

66.5% by weight (in terms of polymer) of PTFE aqueous dispersion (PTFE-A) with SSG of 2.160, 28.5% by weight (in terms of polymer) of low molecular weight PTFE aqueous dispersion (PTFE-B) with melt viscosity of 20000 Pa's measured by a flow tester method at 380° C., and 5% by weight (in terms of polymer) of FEP aqueous dispersion having melting temperature of 215° C. were admixed with one another. After adding 500 ml of 1% aqueous solution of aluminum nitrate as a coagulating agent followed by stirring, co-coagulation was performed. After removing the moisture from the produced powder by using a sieve, it was dried again for 18 hours in a heat wave furnace at 135° C. to obtain mixed powder with the aforementioned three components.

Subsequently, as a liquid lubricant (an extrusion aid), the hydrocarbon oil (manufactured by Idemitsu Kosan Co., Ltd., "IP SOLVENT 2028") was added at 20° C. in an amount of 35 parts by weight per 100 parts by weight of the mixture followed by mixing. Next, the obtained mixture was extruded using a paste extruder to obtain a molded product with a sheet shape. At the tip of the paste extruder, a sheet die formed with a rectangular extrusion outlet having width direction length of 2 mm×length direction length of 150 mm was added. The molded product with a sheet shape was molded into a film shape using a calender roll heated to 70° C. to obtain a fuluororesin film. The film was passed through a heat wave drying furnace at 200° C. to remove the hydrocarbon oil by evaporation, thus obtaining an unsintered fuluororesin film (a first unsintered tape) with band shape having average thickness of 300 µm and average width of 150 mm. Further, an unsintered fluororesin tape (a second unsintered tape) with band shape which average thickness of 300 µm and average width of 150 mm was obtained in the same manner as the first unsintered tape except that the a mixed amount of the liquid lubricant was 33 parts by weight. Next, the first unsintered tape was overlayed on the second unsintered tape and they are drawn in the length direction (longitudinal direction) at drawing ratio of 6.5 times. The drawing temperature was 300° C. Next, the drawn with overlayed unsintered tapes was drawn in the width direction (horizontal direction) at drawing ratio of 13.5 times by using a tenter capable of continuous clipping followed by thermal fixing. At that time, the drawing temperature was 290° C. and the temperature for thermal fixing was 390° C. Accordingly, a multilayered porous membrane which the first unsintered porous membrane was overlayed on the second unsintered porous membrane was obtained.

Subsequently, by using two sheets of spun-bond non-woven fabric "Elebes T0303WDO" (manufactured by Unitika Ltd., average fiber diameter of 24 µm, weight per unit area of 30 g/m$^2$, and thickness of 0.15 mm), which includes a fiber having a core/sheath structure in which PET is used for the core and PE is used for the sheath, and laminating these two non-woven fabrics so that the multilayered porous membrane was disposed between the two non-woven fabrics by thermal fixing using a lamination apparatus, a filtering medium with four layer structure, which is the same as the one illustrated in FIG. 1A, was obtained. Dust holding capacity, pressure loss, and collecting efficiency of the obtained filtering medium were measured according to the following protocols.

Example 2

The filtering medium was prepared in the same manner as Example 1 except that, according to adjustment of a gap between calender rolls, a first unsintered tape with thickness of 300 µm and a second unsintered tape with thickness of 200 µm are used. Evaluation was then made with regard to each property.

Example 3

The filtering medium was prepared in the same manner as Example 1 except that the first unsintered tape and the second unsintered tape are separately drawn in length direction according to the same conditions as Example 1, and the first unsintered tape and the second unsintered tape which have been drawn separately are overlaid on top of each other and drawn in the width direction at the same conditions as Example 1. Evaluation was then made with regard to each property.

Example 4

The filtering medium was prepared in the same manner as Example 1 except that the first unsintered tape is drawn by 7.5 times in length direction at 300° C. condition, the second unsintered tape is drawn by 10 times in length direction at 300° C. condition, and the first unsintered tape and the second unsintered tape which have been drawn separately are overlaid on top of each other and drawn in the width direction at the same conditions as Example 1. Evaluation was then made with regard to each property.

Example 5

The first unsintered tape and the second unsintered tape were drawn separately in the length direction at the same conditions as Example 1 and then drawn in the width direction at the same conditions as Example 1 to obtain the first porous membrane and the second porous membrane. After that, the first porous membrane, the second porous membrane, and 3 pieces of the aforementioned non-woven fabric were alternately laminated by heat fusion using a lamination device to give a filtering medium having five layer structure which is the same as the one illustrated in FIG. 1B. Each property including pressure loss, collecting efficiency, and dust retention amount of the obtained filtering medium was measured according to the following protocols.

Example 6

The first unsintered tape was drawn in the length direction at the same conditions as Example 1 and subsequently drawn in the width direction at the same conditions as Example 1 to obtain a first porous membrane. Meanwhile, per 100 parts by weight of PTFE fine powder, 33 parts by weight of a liquid lubricant was added and mixed. The obtained mixture was extruded by using a paste extrusion device to obtain a molded product with round rod shape. The molded product with round rod shape was molded into a film shape by using a calender roll heated to 70° C. Accordingly, a PTFE film was obtained. This film was passed through a hot air drying furnace at 200° C. to remove hydrocarbon oil by evaporation and an unsintered PTFE film with band shape which average thickness of 200 μm and average width of 150 mm was obtained. This unsintered PTFE film was drawn in length direction at a drawing ratio of 6.5 times. The drawing temperature was 300° C. Next, the drawn unsintered PTFE film was drawn in width direction at a drawing ratio of 30 times by using a tenter which can be continuously clipped. After heat fixing, a PTFE porous membrane was obtained. The drawing temperature was 290° C. at that time and the heat fixing temperature was 350° C.

Next, by using 3 pieces of a non-woven fabric, a filter membrane with five layer structure was obtained in the same manner as Example 5 except that the first porous membrane and the PTFE porous membrane are used. Evaluation was then made with regard to each property of the obtained filtering medium.

Comparative Example 1

A filtering medium was prepared in the same manner as Example 1 except that 33 parts by weight of a liquid lubricant are used for producing the first unsintered tape and 35 parts by weight of a liquid lubricant are used for producing the second unsintered tape. Evaluation was then made with regard to each property.

Comparative Example 2

A filtering medium was prepared in the same manner as Example 1 except that 37 parts by weight of a liquid lubricant are used for producing the first unsintered tape and 31 parts by weight of a liquid lubricant are used for producing the second unsintered tape. Evaluation was then made with regard to each property.

Comparative Example 3

A filtering medium was prepared in the same manner as Example 1 except that, to produce the first unsintered tape and the second unsintered tape, the same amount of a liquid lubricant (34 parts by weight) is used for both the first unsintered tape and the second unsintered tape. Evaluation was then made with regard to each property.

Conventional Example 1

A filtering medium was prepared in the same manner as Example 1 except that, to produce the first unsintered tape and the second unsintered tape, the same amount of a liquid lubricant (32 parts by weight) is used for both the first unsintered tape and the second unsintered tape, and drawing is performed in length direction at a drawing ratio of 7.5 times and also in width direction at a drawing ratio of 15 times. Evaluation was then made with regard to each property.

Conventional Example 2

By using 35 parts by weight of the liquid lubricant, the first unsintered PTFE film was prepared in the same order as the method for producing a PTFE porous membrane of Example 6. Meanwhile, an unsintered PTFE film was prepared in the same manner as the first unsintered PTFE film except that the liquid lubricant is used in an amount of 33 parts by weight. Accordingly, the second unsintered PTFE film was obtained. The first unsintered PTFE film and the second unsintered PTFE film were overlaid on top of each other and then drawn in length direction at a drawing ratio of 6.5 times. The drawing temperature was 300° C. Next, the drawn unsintered PTFE film was drawn in width direction at a drawing ratio of 30 times by using a tenter which can be continuously clipped. It was then subjected to heat fixing. The drawing temperature was 290° C. at that time and the heat fixing temperature was 390° C. After that, a filter membrane with four layer structure was prepared in the same manner as Example 1 except that the first unsintered PTFE film and the second unsintered PTFE film are used. Evaluation was then made with regard to each property.

The measurement results obtained from Examples 1 to 6, Comparative Examples 1 to 3, and Conventional Examples 1 and 2 are described in Table 1 and Table 2. Each property shown in Table 1 and Table 2 was measured or calculated according to the following protocols. Meanwhile, the measurement of pressure loss, collecting efficiency, and dust retention amount of the first porous membrane and the second porous membrane was performed after laminating an air permeable support on at least one of the porous membranes if the first porous membrane and the second porous membrane are obtained as a separate body, or after carefully separating an integrally-formed porous membrane and laminating an air permeable support on each of the porous membranes if the first porous membrane and the second porous membrane are formed integrally.

In Table 1 and Table 2, "Mixture of 3 types" means mixed powder of three components. "Same" means that the same production conditions are applied for both the first porous membrane and the second porous membrane, while "Different" means that different production conditions are applied for the first porous membrane and the second porous membrane. "Timing for overlay" means the timing for overlaying or laminating the first porous membrane or an unsintered film (unsintered tape) to become the first porous membrane and the second porous membrane or an unsintered film (unsintered tape) to become the second porous membrane. With regard to the raw materials, "1 Type" means that the raw material is composed only one type of a component.

(Pressure Loss)

A test sample of the filtering medium was set in a filter holder with diameter of 100 mm. The inlet side was pressurized using a compressor and the air flow amount was set at 5.3 cm/second by using a flow meter. The pressure loss at that time was measured by using a manometer.

(Collecting Efficiency for NaCl Particles with Particle Diameter of 0.3 μm)

NaCl particles were generated by using an atomizer according to the method described in method for generating 5 (normal) NaCl aerosol described in the attachment of JIS B9928 and classified to 0.3 μm by an electrostatic classifier (manufactured by TSI). Then, americium 241 was used to neutralize the particle charges, thereafter the flow rate at which particles passed through was adjusted to 5.3 cm/sec, a particle counter (CNC manufactured by TSI) was used to find the number of particles before and after the porous membrane as a test sample, and the collecting efficiency was calculated by the following equation.

Collecting efficiency (%)=($CO/CI$)×100

CO=Number of particles of NaCl 0.3 μm captured by test sample
CI=Number of particles of NaCl 0.3 μm supplied to test sample (PF Value)

The PF value was obtained from the pressure loss and the collecting efficiency (collecting efficiency for NaCl particles with particle diameter of 0.3 μm) of the filter medium according to following the equation using NaCl particles with particle diameter of 0.3 μm.

PF value=−log(Transmittance (%)/100)/Pressure loss (Pa)×1000

In the formula, Transmittance=100−Collecting efficiency (%)

(Dust Collecting Capacity with Polyalphaolefin)

Evaluation was made based on the pressure loss build-up test at the time of passage of polyalphaolefin (PAO) particles. That is, pressure loss when air including PAO particles was continuously passed at a flow rate of 5.3 cm/sec through a sample filtering medium with an effective filtration area of 50 cm$^2$ was measured over time with a differential pressure gauge (U-tube manometer), and when pressure loss increased to 250 Pa, the dust holding capacity (g/m$^2$), which is the weight of the PAO particles held in the filtering medium per unit area of the filtering medium, was obtained. As for the PAO particles, PAO particles (with a count median diameter of 0.25 μm) generated with a Laskin nozzle were used, and the concentration of the PAO particles was about 1,000,000 to 6,000,000/cm$^3$.

Although there is no dust collecting capacity defined for a HEPA filtering medium, it is generally believed that the initial filter pressure loss is about 250 Pa or less for a HEPA unit and, with regard to the filter exchange time, the time point at which the loss is more than two times the initial filter pressure loss is generally recommended. Further, the initial pressure loss of a glass filtering medium for a standard HEPA is about 250 to 300 Pa. For such reasons, the time point at which the pressure loss is increased to 250 Pa was taken as the end point of the above test for evaluating the dust collecting capacity of the filtering medium.

(Average Pore Diameter)

The average pore diameter (mean flow pore size) which is measured based on the descriptions of ASTM F316-86 was used as the average pore diameter (average flow path diameter) of a porous membrane. Actual measurement was made by using Coulter Porometer [manufactured by Coulter Electronics, UK].

(Membrane Thickness)

5 pieces of the porous membrane were overlaid on top of one another and the total membrane pressure was measured by using a membrane thickness gauge (model 1D-110MH, manufactured by Mitutoyo Corporation), and the value obtained by dividing the measurement value by 5 was used as membrane thickness of 1 piece of the porous membrane. This membrane thickness corresponds to the membrane thickness of one whole porous membrane (average membrane thickness).

(Filling Ratio)

Filling ratio of a porous membrane was obtained based on the following formula.

Filling ratio (%)=(Specific gravity of porous membrane)/(Specific gravity of raw material)×100

Specific gravity of porous membrane=(Weight of porous membrane)/(Membrane thickness of porous membrane×Area of porous membrane)

Meanwhile, in case of a mixed raw material consisting of plural components, the value obtained by dividing the sum of the product of weight ratio of each component and specific gravity of each component by the sum of the weight ratio was used as the specific gravity of a raw material.

TABLE 1

| | | | | Example 1 | Example 2 | Example 3 | Example 4 | Example 5 | Example 6 |
|---|---|---|---|---|---|---|---|---|---|
| | Number of layers | | | 4 | 4 | 4 | 4 | 5 | 5 |
| Conditions for production | First porous membrane | Raw materials | | Mixture of 3 types | Mixture of 3 types | Mixture of 3 types | Mixture of 3 types | Mixture of 3 types | Mixture of 3 types |
| | | Amount of aid (parts by weight) | | 35 | 35 | 35 | 35 | 35 | 35 |
| | Second porous membrane | Raw materials | | Mixture of 3 types | Mixture of 3 types | Mixture of 3 types | 3 Types | Mixture of 3 types | 1 Type |
| | | Amount of aid (parts by weight) | | 33 | 33 | 33 | 33 | 33 | 33 |
| | | Thickness of unsintered tape | | Same | Different | Same | Same | Same | Different |

TABLE 1-continued

|  |  | Example 1 | Example 2 | Example 3 | Example 4 | Example 5 | Example 6 |
|---|---|---|---|---|---|---|---|
| Drawing ratio | Vertical direction | Same | Same | Same | Different | Same | Same |
|  | Horizontal direction | Same | Same | Same | Same | Same | Different |
| Timing for overlay |  | Before vertical drawing | Before vertical drawing | After vertical drawing | After vertical drawing | After horizontal drawing | After horizontal drawing |
| Dust retention amount (g/m$^2$) | Filtering medium | 27 | 26.5 | 28 | 26 | 27 | 29.5 |
|  | First porous membrane | 26.5 | 26.5 | 27.5 | 26 | 26 | 26 |
|  | Second porous membrane | 22 | 20.5 | 23 | 20.5 | 23 | 5.1 |
| Pressure loss (Pa) | Filtering medium | 140 | 130 | 150 | 132 | 158 | 155 |
|  | First porous membrane | 47 | 46 | 52 | 48 | 57 | 57 |
|  | Second porous membrane | 93 | 84 | 100 | 86 | 101 | 98 |
| Collecting efficiency (%) | Filtering medium | 99.9910 | 99.9921 | 99.9930 | 99.9940 | 99.9943 | 99.9991 |
|  | First porous membrane | 97.0000 | 97.0000 | 98.0000 | 97.0000 | 96.0000 | 96.0000 |
|  | Second porous membrane | 99.7000 | 99.7500 | 99.7620 | 99.8230 | 99.9300 | 99.9800 |
| PF value | Filtering medium | 28.9 | 31.6 | 27.7 | 32.0 | 26.9 | 32.6 |
| Average flow path diameter (μm) | First porous membrane | 3.7 | 3.4 | 3.5 | 3.2 | 3.6 | 3.7 |
|  | Second porous membrane | 2.2 | 2.1 | 2.9 | 2.3 | 2.1 | 0.8 |
| Thickness (μm) | First porous membrane | 48 | 49 | 50 | 49 | 48 | 48 |
|  | Second porous membrane | 52 | 49 | 51 | 40 | 48 | 8 |
| Filling ratio (%) | First porous membrane | 4 | 4 | 4 | 4 | 4 | 4 |
|  | Second porous membrane | 4 | 4 | 4 | 4 | 4 | 8 |

TABLE 2

|  |  |  | Comparative Example 1 | Comparative Example 2 | Comparative Example 3 | Conventional Example 1 | Conventional Example 2 |
|---|---|---|---|---|---|---|---|
|  | Number of layers |  | 4 | 4 | 4 | 4 | 4 |
| Conditions for production | First porous membrane | Raw materials | Mixture of 3 types | Mixture of 3 types | Mixture of 3 types | Mixture of 3 types | 1 Type |
|  |  | Amount of aid (parts by weight) | 33 | 37 | 34 | 32 | 35 |
|  | Second porous membrane | Raw materials | Mixture of 3 types | Mixture of 3 types | Mixture of 3 types | Mixture of 3 types | 1 Type |
|  |  | Amount of aid (parts by weight) | 35 | 31 | 34 | 32 | 33 |
|  | Thickness of unsintered tape |  | Same | Same | Same | Same | Same |
|  | Drawing ratio | Vertical direction | Same | Same | Same | Same | Same |
|  |  | Horizontal direction | Same | Same | Same | Same | Same |
|  | Timing for overlay |  | Before vertical drawing | Before vertical drawing | Before vertical drawing | Before vertical drawing | Before vertical drawing |
| Dust retention amount (g/m$^2$) | Filtering medium |  | 23 | 24 | 22 | 23.4 | 5.1 |
|  | First porous membrane |  | 22 | 24 | 21 | 23.4 | 5.0 |
|  | Second porous membrane |  | 26.5 | 22 | 23 | 23.4 | 4.2 |
| Pressure loss (Pa) | Filtering medium |  | 140 | 151 | 144 | 150 | 266 |
|  | First porous membrane |  | 93 | 30 | 72 | 75 | 132 |
|  | Second porous membrane |  | 47 | 125 | 72 | 75 | 134 |
| Collecting efficiency (%) | Filtering medium |  | 99.9910 | 99.9680 | 99.9987 | 99.9968 | 99.9999 |
|  | First porous membrane |  | 99.7000 | 94.0000 | 99.6322 | 99.4300 | 99.9000 |
|  | Second porous membrane |  | 97.0000 | 99.7000 | 99.6334 | 99.4300 | 99.9990 |
| PF value | Filtering medium |  | 28.9 | 24.5 | 33.9 | 30.0 | 22.6 |
| Average flow path diameter (μm) | First porous membrane |  | 2.2 | 4.1 | 2.9 | 1.6 | 0.8 |
|  | Second porous membrane |  | 3.7 | 2.0 | 2.8 | 1.6 | 0.8 |
| Thickness (μm) | First porous membrane |  | 52 | 40 | 50 | 45 | 8 |
|  | Second porous membrane |  | 48 | 49 | 50 | 45 | 8 |
| Filling ratio (%) | First porous membrane |  | 4 | 3.5 | 4 | 4 | 8 |
|  | Second porous membrane |  | 4 | 4 | 4 | 4 | 8 |

As it can be understood from Table 1, if the dust retention amount of the first porous membrane is greater than the dust retention amount of the second porous membrane (Examples 1 to 6), it was possible to have a filtering medium which has a pressure loss of less than 200 Pa, collecting efficiency of 99.97% or more, and dust retention amount of 25 g/m$^2$ or more. Furthermore, if the second porous membrane is prepared to have a smaller average flow path diameter than the first porous membrane (Examples 1 to 6), it was possible to have a filtering medium which has a pressure loss of less than 200 Pa, collecting efficiency of 99.97% or more, and dust retention amount of 25 g/m$^2$ or more.

As it can be understood from Table 2, if the average pore diameter of the first porous membrane is smaller than that of the second porous membrane (Comparative Example 1), the dust retention amount of a filtering medium was less than 25 g/m². Furthermore, if the dust retention amount of the first porous membrane is smaller than the dust retention amount of the second porous membrane (Comparative Example 3), the dust retention amount of a filtering medium was less than 25 g/m². Meanwhile, although the dust retention amount, collecting efficiency, and average flow path diameter are different between the two porous membranes in Comparative Example 3, such difference is within a measurement error range of one piece of a filtering medium, and there was no difference in significant sense. Furthermore, if the amount of a liquid lubricant used for producing the two porous membranes is the same (Comparative Example 3), the dust retention amount was less than 25 g/m².

In the above, the filtering medium for an air filter, filter pack, air filter unit, and method for producing the filtering medium for an air filter of the present invention are described in detail. However, the present invention is not limited to above embodiments, and without departing from the main spirit of the present invention, various improvements or modifications can be surely made.

What is claimed is:

1. A filtering medium for an air filter for collecting fine particles in air, the filter medium comprising:
    a first porous membrane mainly composed of a fluororesin;
    a second porous membrane mainly composed of a fluororesin that is disposed on a downstream side of airflow compared to the first porous membrane; and
    a plurality of air permeable supports disposed to form at least an outermost layer of the filtering medium to support the first porous membrane and the second membrane,
    when air containing polyalphaolefin particles with a count median diameter of 0.25 μm is continuously passed through at a flow rate of 5.3 cm/sec and the pressure loss is increased by 250 Pa, the first porous membrane having a dust retention amount of the polyalphaolefin particles larger than the second porous membrane,
    the filtering medium having a pressure loss of less than 200 Pa when the air is passed through at a flow rate of 5.3 cm/sec,
    a collecting efficiency of NaCl particles with a particle diameter of 0.3 μm being 99.97% or more when the air containing the NaCl particles is passed through at a flow rate of 5.3 cm/sec, and
    the dust retention amount being 25 g/m² or more.

2. The filtering medium for an air filter according to claim 1, wherein
    the first porous membrane has lower pressure loss than the second porous membrane and the second porous membrane has higher collecting efficiency than the first porous membrane.

3. The filtering medium for an air filter according to claim 1, wherein
    the dust retention amount of the first porous membrane is 25 to 35 g/m², the pressure loss of the first porous membrane is 30 to 90 Pa, and the collecting efficiency of the first porous membrane is 95 to 99%.

4. The filtering medium for an air filter according to claim 1, wherein
    the filtering medium has a four layer structure including the first porous membrane, the second porous membrane, and two pieces of the air permeable support.

5. The filtering medium for an air filter according to claim 1, wherein
    the filtering medium has a five layer structure including the first porous membrane, the second porous membrane, and three pieces of the air permeable support, and
    one piece of the air permeable support is disposed between the first porous membrane and the second porous membrane.

6. The filtering medium for an air filter according to claim 1, wherein
    the first porous membrane includes polytetrafluoroethylene which can be fibrillated, a non hot-melt processable component which cannot be fibrillated, and a hot-melt processable component having a melting point of lower than 320° C. which cannot be fibrillated.

7. A filter pack including the filtering medium for an air filter according to claim 1, wherein
    the filtering medium is processed to have a zigzag shape according to alternatively repeated outside folding and inside folding.

8. An air filter unit including the filtering medium for an air filter according to claim 1, the air filter unit further comprising
    a frame body supporting the filtering medium.

9. A method of producing a filtering medium for an air filter for collecting fine particles in air, the method comprising:
    preparing a first porous membrane by using a fluororesin and a liquid lubricant;
    preparing a second porous membrane to have a smaller average pore diameter than the first porous membrane by using a fluororesin and a liquid lubricant; and
    producing the filtering medium by laminating the first porous membrane, the second porous membrane, and a plurality of air permeable supports which support the first porous membrane and the second porous membrane,
    the producing is carried out such that the plurality of air permeable supports are disposed to form at least an outermost layer of the filtering medium,
    the filtering medium having the pressure loss of less than 200 Pa,
    a collecting efficiency of NaCl particles with a particle diameter of 0.3 μm being 99.97% or more when the air containing the NaCl particles is passed through at a flow rate of 5.3 cm/sec, and
    the dust retention amount of polyalphaolefin being 25 g/m² or more when the air containing the polyalphaolefin particles with a count median diameter of 0.25 μm is continuously passed through at a flow rate of 5.3 cm/sec and the pressure loss is increased by 250 Pa.

10. The method for producing a filtering medium for an air filter according to claim 9, wherein
    the second porous membrane is prepared by using the liquid lubricant, in an amount per unit weight of the fluororesin smaller than an amount of the liquid lubricant used in preparing the first porous membrane.

11. The method for producing a filtering medium for an air filter according to claim 9, wherein
    a difference between
        an amount of liquid lubricant used in preparing the first porous membrane relative to 100 parts by weight of fluororesin and
        an amount of liquid lubricant which is used in preparing the first porous membrane relative to 100 parts by weight of fluororesin is 1 to 4 parts by weight.

12. The method for producing a filtering medium for an air filter according to claim 9, wherein
the first porous membrane is prepared by using, as the fluororesin, polytetrafluoroethylene which can be fibrillated, a non hot-melt processable component which cannot be fibrillated, and a hot-melt processable component having a melting point of lower than 320 20 C. which cannot be fibrillated.

13. The filtering medium for an air filter according to claim 2, wherein
the dust retention amount of the first porous membrane is 25 to 35 g/m², the pressure loss of the first porous membrane is 30 to 90 Pa, and the collecting efficiency of the first porous membrane is 95 to 99%.

14. The filtering medium for an air filter according to claim 2, wherein
the filtering medium has a four layer structure including the first porous membrane, the second porous membrane, and two pieces of the air permeable support.

15. The filtering medium for an air filter according to claim 2, wherein
the filtering medium has a five layer structure including the first porous membrane, the second porous membrane, and three pieces of the air permeable support, and
one piece of the air permeable support is disposed between the first porous membrane and the second porous membrane.

16. The filtering medium for an air filter according to claim 2, wherein
the first porous membrane includes polytetrafluoroethylene which can be fibrillated, a non hot-melt processable component which cannot be fibrillated, and a hot-melt processable component having a melting point of lower than 320° C. which cannot be fibrillated.

17. The filtering medium for an air filter according to claim 3, wherein
the filtering medium has a four layer structure including the first porous membrane, the second porous membrane, and two pieces of the air permeable support.

18. The filtering medium for an air filter according to claim 3, wherein
the filtering medium has a five layer structure including the first porous membrane, the second porous membrane, and three pieces of the air permeable support, and
one piece of the air permeable support is disposed between the first porous membrane and the second porous membrane.

19. The filtering medium for an air filter according to claim 3, wherein
the first porous membrane includes polytetrafluoroethylene which can be fibrillated, a non hot-melt processable component which cannot be fibrillated, and a hot-melt processable component having a melting point of lower than 320° C. which cannot be fibrillated.

20. An air filter unit including the filter pack according to claim 7, the air filter unit further comprising
a frame body supporting the filter pack.

* * * * *